US008687006B2

(12) United States Patent
Park et al.

(10) Patent No.: US 8,687,006 B2
(45) Date of Patent: Apr. 1, 2014

(54) DISPLAY DEVICE INCLUDING IMAGE SIGNAL PROCESSOR AND IMAGE INTERPOLATION CHIP

(75) Inventors: Dong-Won Park, Cheonan-si (KR); Sang-Soo Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 1036 days.

(21) Appl. No.: 12/491,633

(22) Filed: Jun. 25, 2009

(65) Prior Publication Data

US 2010/0123698 A1 May 20, 2010

(30) Foreign Application Priority Data

Nov. 20, 2008 (KR) ........................ 10-2008-0115763

(51) Int. Cl.
*G06T 13/00* (2011.01)
(52) U.S. Cl.
USPC ........................................................ 345/475
(58) Field of Classification Search
USPC ........................................................ 345/475
See application file for complete search history.

(56) References Cited

U.S. PATENT DOCUMENTS

| 7,400,321 | B2 | 7/2008 | Aiba et al. | |
|---|---|---|---|---|
| 2008/0191983 | A1 | 8/2008 | Chang et al. | |
| 2008/0291326 | A1* | 11/2008 | Shishido et al. | 348/555 |
| 2010/0007650 | A1* | 1/2010 | Choi et al. | 345/213 |

FOREIGN PATENT DOCUMENTS

| JP | 11045076 A | 2/1999 |
|---|---|---|
| JP | 2005091454 | 4/2005 |
| JP | 2006065279 A | 3/2006 |
| JP | 2006337448 A | 12/2006 |
| JP | 2010056694 A | 3/2010 |

* cited by examiner

*Primary Examiner* — Said Broome
*Assistant Examiner* — Peter Hoang
(74) *Attorney, Agent, or Firm* — Cantor Colburn LLP

(57) ABSTRACT

A display device includes a display panel having pixels and divided into first and second display regions; first and second image interpolation chips which receive an original image signal and output interpolated ¼, ½, and/or ¾ frames inserted between a previous (n−1)-th frame and a current n-th frame of the original image signal; a first timing unit which receives the interpolated ¼, ½, and/or ¾ frames from the first image interpolation chip and outputs a first quadruple-speed image signal to pixels in the first display region; and a second timing unit which receives the interpolated ¼, ½, and/or ¾ frames from the second image interpolation chip and outputs a second quadruple-speed image signal to pixels in the second display region. The first timing unit transmits data to the second timing unit, and the second timing unit transmits data to the first timing unit.

20 Claims, 16 Drawing Sheets

< RGB (freq = 60Hz) >

DISPLAY DEVICE INCLUDING IMAGE SIGNAL PROCESSOR AND IMAGE INTERPOLATION CHIP

This application claims priority to Korean Patent Application No. 10-2008-0115763, filed on Nov. 20, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device, and more particularly, to a display device including an image signal processor which can output a high-speed image signal using an image interpolation chip for outputting a low-speed image signal.

2. Description of the Related Art

In an effort to improve a display quality of display devices, a technology which inserts interpolated frames, compensated for motion of an object, between original frames is being developed. Generally, display devices provide image information at 60 frames per second. However, the abovementioned technology enables display devices to generate image information for interpolated frames and thereby display an image at 120 frames per second.

To implement this technology, a display device typically includes an image interpolation chip which outputs an n fold-speed image signal (where n is an integer) having interpolated frames inserted therein. Thus, as a number of interpolated frames inserted between original frames increases, a display quality of the display device is substantially enhanced. However, an image interpolation chip, which outputs a high-speed image signal having an increased number of the interpolated frames inserted therein, is required. As a result, time and costs required to develop the image interpolation chip which outputs the high-speed image signal are substantially increased.

BRIEF SUMMARY OF THE INVENTION

Exemplary embodiments of the present invention provide a display device including an image signal processor which outputs a high-speed image signal using an image interpolation chip for outputting a low-speed image signal.

According to an exemplary embodiment of the present invention, a display device includes: a display panel which includes pixels and which is divided into a first display region and a second display region; a first image interpolation chip which receives an original image signal and outputs a previous (n−1)-th frame of the original image signal and one of a ¼-th interpolated frame, a ½-th interpolated frame and a ¾-th interpolated frame, the one of the ¼-th interpolated frame, the ½-th interpolated frame and the ¾-th interpolated frame being inserted between the previous (n−1)-th frame of the original image signal and a current n-th frame of the original image signal; a second image interpolation chip which receives the original image signal and outputs two of the ¼-th interpolated frame, the ½-th interpolated frame and the ¾-th interpolated frame; a first timing unit which receives the previous (n−1)-th frame and the one of the ¼-th interpolated frame, the ½-th interpolated frame and the ¾-th interpolated frame from the first image interpolation chip and outputs a first quadruple-speed image signal to the pixels in the first display region; and a second timing unit which receives the two of the ¼-th interpolated frame, the ½-th interpolated frame and the ¾-th interpolated frame from the second image interpolation chip and outputs a second quadruple-speed image signal to pixels in the second display region. The first timing unit transmits data corresponding to the previous (n−1)-th frame and the one of the ¼-th interpolated frame, the ½-th interpolated frame and the ¾-th interpolated frame to the second timing unit, and the second timing unit transmits data corresponding to the two of the ¼-th interpolated frame, the ½-th interpolated frame and the ¾-th interpolated frame to the first timing unit.

According to an exemplary embodiment of the present invention, a display device includes: a display panel which includes pixels; an image interpolation unit which receives an original image signal and outputs both a previous (n−1)-th frame of the original image signal, as well as a ¼-th interpolated frame, a ½-th interpolated frame and a ¾-th interpolated frame which are inserted between the (n−1)-th frame and a current n-th frame of the original image signal; and one or more timing units which receive the previous (n−1)-th frame, the ¼-th interpolated frame, the ½-th interpolated frame and the ¾-th interpolated frame simultaneously during a period, correct a gray level of the previous (n−1)-th frame, the ¼-th interpolated frame, the ½-th interpolated frame and the ¾-th interpolated frame, based on a relationship between a gray level of the previous (n−1)-th frame and a gray level of the current n-th frame to output a corrected previous (n−1)-th frame, a corrected ¼-th interpolated frame, a corrected ½-th interpolated frame and a corrected ¾-th interpolated frame, respectively, sequentially rearrange the corrected previous (n−1)-th frame, the corrected ¼-th interpolated frame, the corrected ½-th interpolated frame and the corrected ¾-th interpolated frame, and output the corrected previous (n−1)-th frame, the corrected ¼-th interpolated frame, the corrected ½-th interpolated frame and the corrected ¾-th interpolated frame during the period. The one or more timing units corrects a gray level of the current n-th frame and sequentially rearranges the corrected previous (n−1)-th frame, the corrected ¼-th interpolated frame, the corrected ½-th interpolated frame and the corrected ¾-th interpolated frame using a same memory.

According to exemplary embodiment of the present invention, a method of driving a display device includes: preparing a display panel comprising pixels, wherein the display panel includes a first display region and a second display region; receiving an original image signal with a first image interpolation chip; inserting one of the ¼-th interpolated frame, a ½-th interpolated frame and a ¾-th interpolated frame between a previous (n−1)-th frame of the original image signal and a subsequent n-th frame of the original image signal with the first image interpolation chip; outputting the previous (n−1)-th frame of the original image signal and the one of the ¼-th interpolated frame, the ½-th interpolated frame and the ¾-th interpolated frame from the first image interpolation chip to a first timing unit; receiving the original image signal with a second image interpolation chip; outputting two of the ¼-th interpolated frame, the ½-th interpolated frame and the ¾-th interpolated frame from the second image interpolation chip to a second timing unit; outputting a first quadruple-speed image signal to the pixels in the first display region with the first timing unit; outputting a second quadruple-speed image signal to pixels in the second display region with the second timing unit; transmitting data corresponding to the previous (n−1)-th frame and the one of the ¼-th interpolated frame, the ½-th interpolated frame and the ¾-th interpolated frame from the first timing unit to the second timing unit; and transmitting data corresponding to the two of the ¼-th interpolated frame, the ½-th interpolated frame and the ¾-th interpolated frame from the second timing unit to the first timing unit. The first timing unit and the second timing unit include a timing chip, a first timing memory and a second timing memory.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
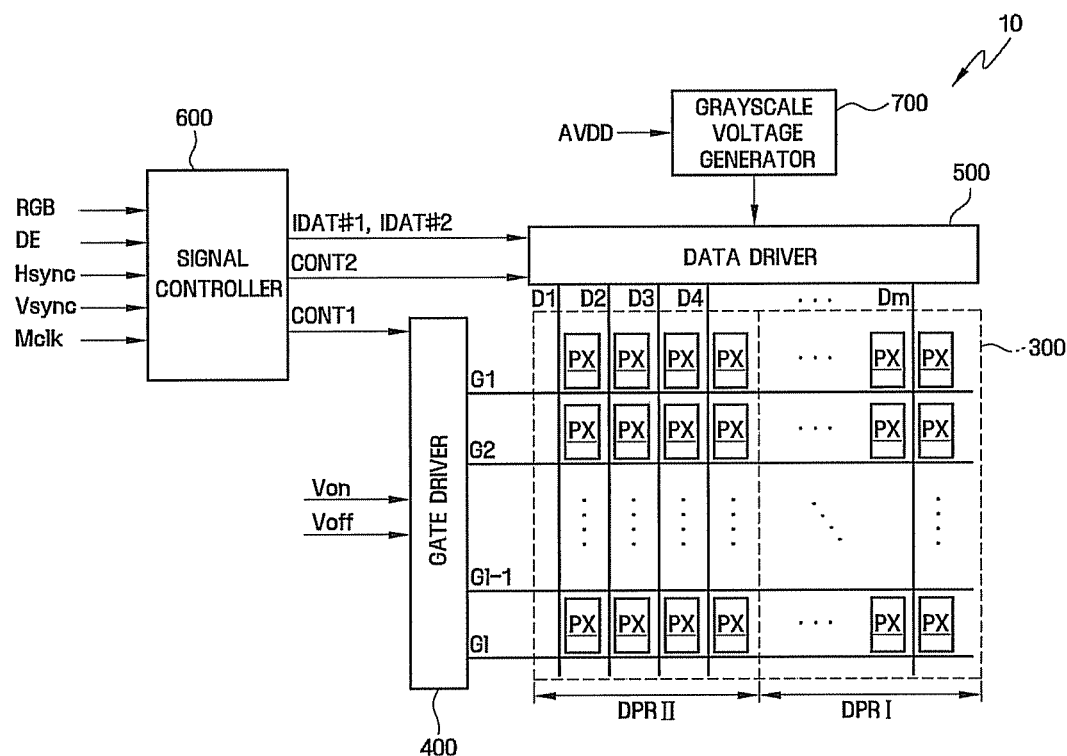
FIG. 1 is a block diagram of an exemplary embodiment of a display device according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2:
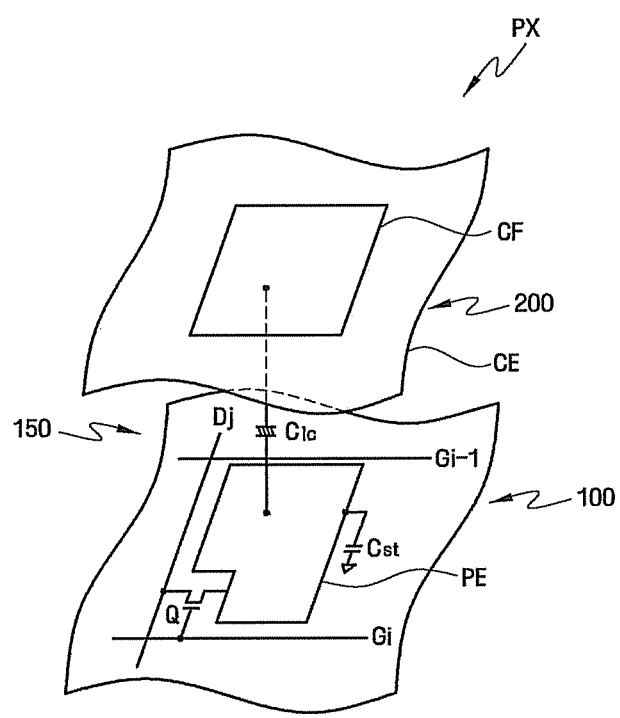
FIG. 2 is an equivalent circuit diagram of a pixel included in an exemplary embodiment of a display panel of the display device shown in FIG. 1.

FIG. 1 is a block diagram of an exemplary embodiment of a display device 10 according to the present invention. FIG. 2 is an equivalent circuit diagram of a pixel PX included in a display panel 300 of the display device 10 shown in FIG. 1.

Referring to FIG. 1, the display device 10 according to an exemplary embodiment includes the display panel 300, a signal controller 600, a gate driver 400, a data driver 500 and a grayscale voltage generator 700.

The display panel 300 according to an exemplary embodiment includes gate lines G1 through Gl, data lines D1 through Dm and pixels PX. The gate lines G1 through Gl extend in a first, substantially row, direction and are substantially parallel to each other, while the data lines D1 through Dm extend in a second, substantially column, direction substantially perpendicular to the first direction, and are substantially parallel to each other, as shown in FIG. 1. In an exemplary embodiment, the pixels PX may be defined by regions in which the gate lines G1 through Gl cross the data lines D1 through Dm. The gate driver 400 transmits gate signals to the gate lines G1 through Gl, and the data driver 500 transmits image data voltages to the data lines D1 through Dm. The pixels PX display an image in response to the image data voltages.

As will be described in greater detail below, the signal controller 600 outputs a first quadruple-("4×")-speed image signal IDAT#1 and a second 4×-speed image signal IDAT#2 to the data driver 500, and the data driver 500 may output image data voltages corresponding to the first 4×-speed image signal IDAT#1 and the second 4×-speed image signal IDAT#2. The pixels PX of the display panel 300 display the image in response to the first 4×-speed image signal IDAT#1 and the second 4×-speed image signal IDAT#2, the pixels PX display images corresponding to the first 4×-speed image signal IDAT#1 and the second 4×-speed image signal IDAT#2, as will be described in greater detail below.

As shown in FIG. 1, the display panel 300 according to an exemplary embodiment is divided into a first display region DPR I and a second display region DPR II. The first 4×-speed image signal IDAT#1 is provided to pixels PX in the first display region DPR I, and the second 4×-speed image signal IDAT#2 is provided to pixels PX in the second display region DPR II. The pixels PX included in the first display region DPR I may display an image, which corresponds to the first 4×-speed image signal IDAT#1, in response to the first 4×-speed image signal IDAT#1, while the pixels PX included in the second display region DPR II may display an image which corresponds to the second 4×-speed image signal IDAT#2, in response to the second 4×-speed image signal IDAT#2.

The display panel 300 may be divided into display blocks DB (FIG. 7), each including a plurality of the pixels PX arranged in a substantially matrix pattern having columns and rows, for example. The display blocks DB will be described in further detail below with reference to FIG. 7.

Referring now to FIG. 2, each of the pixels PX 1 may be connected to, for example, an $i^{th}$ (where i=1 to 1) gate line Gi and a $j^{th}$ (where j=1 to m) data line Dj. In addition, each of the pixels PX may include a switching device Qp, connected to the—$^{th}$ th gate line G—and the $j^{th}$ data line Dj, and a liquid crystal capacitor Clc and a storage capacitor Cst connected to the switching device Qp. The liquid crystal capacitor Clc may include two electrodes, e.g., a pixel electrode PE disposed on a first substrate 100 and a common electrode CE disposed on a second substrate 200, and liquid crystal molecules 150 interposed between the pixel electrode PE and the common electrode CE. A color filter CF may be disposed in a region proximate to the common electrode CE and/or the pixel electrode PE.

Referring again to FIG. 1, the signal controller 600 receives an original image signal RGB and external control signals for controlling display of the original image signal RGB, and outputs the first 4×-speed image signal IDAT#1 and the second 4×-speed image signal IDAT#2, gate control signals CONT1 and data control signals CONT2. In an exemplary embodiment, the original image signal RGB has a first image frequency, and each of the first 4×-speed image signal IDAT#1 and the second 4×-speed image signal IDAT#2 have a second image frequency. In an exemplary embodiment, the second image frequency is four times the first image frequency. For example, when the original image signal RGB has a frequency of 60 Hz, the first 4×-speed image signal IDAT#1 and the second 4×-speed image signal IDAT#2 each have a frequency of 240 Hz.

In an exemplary embodiment, the signal controller 600 receives the original image signal RGB and outputs the first 4×-speed image signal IDAT#1 and the second 4×-speed image signal IDAT#2. The signal controller 600 may also receive the external control signals from an external source (not shown) and generate the gate control signals CONT1 and the data control signals CONT2. The external control signals may include, for example, a vertical synchronization signal Vsync, a horizontal synchronization signal Hsync, a main clock signal Mclk and a data enable signal DE. The data control signals CONT1 control an operation of the gate driver 400, and the data control signals CONT1 control an operation of the data driver 500. The signal controller 600 will be described in greater detail below with reference to FIG. 3.

The gate driver 400 receives the gate control signals CONT1 from the signal controller 600 and transmits gate signals to the gate lines G1 through Gl. In an exemplary embodiment, the gate signals may include a gate-on voltage Von and/or a gate-off voltage Voff provided by a gate on/off voltage generator (not shown).

The data driver 500 receives the data control signals CONT2 from the signal controller 600 and applies image data voltages, which correspond to the first 4×-speed image signal IDAT#1 and the second 4×-speed image signal IDAT#2, to the data lines D1 through Dm. The image data voltages corresponding to the first 4×-speed image signal IDAT#1 and the second 4×-speed image signal IDAT#2 may be provided by the grayscale voltage generator 700.

The grayscale voltage generator 700 according to an exemplary embodiment divides a driving voltage AVDD into a plurality of image data voltages, based on the gray levels of the first 4×-speed image signal IDAT#1 and the second 4×-speed image signal IDAT#2 and provides the image data voltages to the data driver 500. The grayscale voltage generator 700 may include, for example, resistors connected in electrical series with each other between a node, to which the driving voltage AVDD is applied, and a ground source, but alternative exemplary embodiments are not limited thereto. Thus, the grayscale voltage generator 700 divides a level of the driving voltage AVDD and generates grayscale voltages. An internal circuit arrangement of the grayscale voltage generator 700 is not limited to the exemplary embodiment described above, and may be implemented in various ways in alternative exemplary embodiments.

Figure 3:
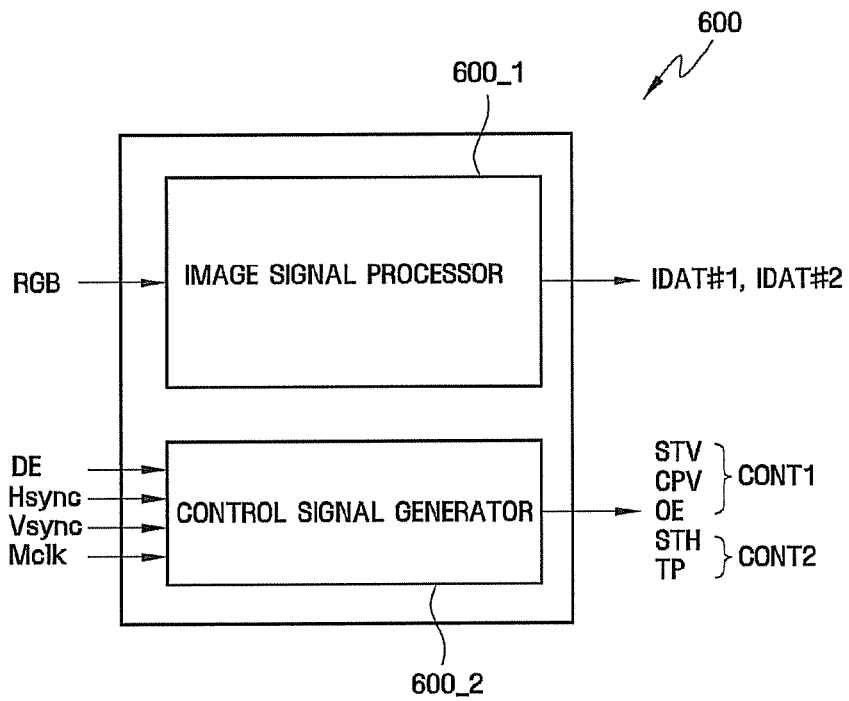
FIG. 3 is a block diagram of an exemplary embodiment of a signal controller of the display device shown in FIG. 1.
Figure 4A:
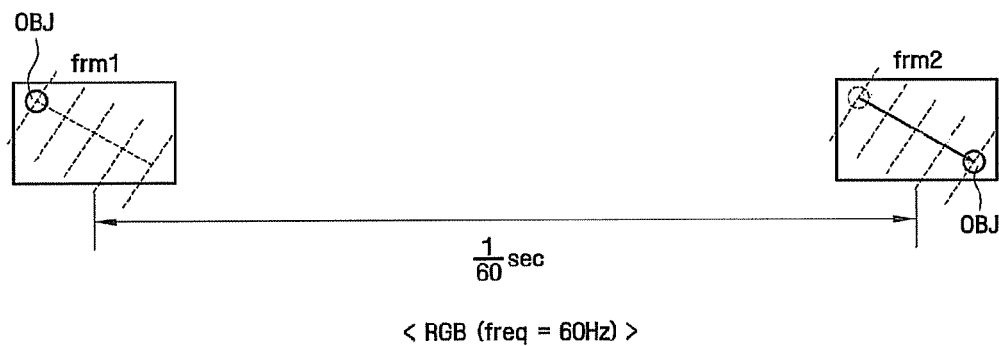
FIG. 4A is a signal timing diagram which illustrates frames included in an original image signal of the signal controller shown in FIG. 3.
Figure 4B:
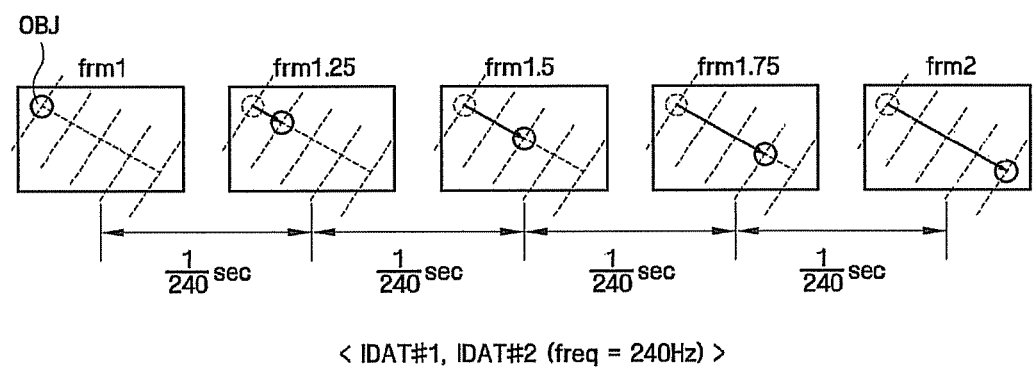
FIG. 4B is a signal timing diagram which illustrates frames included in a quadruple (4×)-speed image signal of the signal controller shown in FIG. 3.

FIG. 3 is a block diagram of an exemplary embodiment of the signal controller 600 included in the display device 10 shown in FIG. 1. FIG. 4A is a signal timing diagram which illustrates frames included in the original image signal RGB of the signal controller 600 shown in FIG. 3, and FIG. 4B is a signal timing diagram which illustrates frames included in a quadruple (4×)-speed image signals IDAT#1 and IDAT#2 of the signal controller 600 shown in FIG. 3.

Referring to FIG. 3, the signal controller 600 includes an image signal processor 600_1 and a control signal generator 600_2.

To substantially improve display quality of the display device 10 according to an exemplary embodiment, the image signal processor 600_1 inserts interpolated frames, for which motion of an object OBJ (FIGS. 4A and 4B) has been compensated, between original frames and output the original frames having the interpolated frames inserted therebetween. For example, the image signal controller 600_1 may receive the original image signal RGB and output the first 4×-speed image signal IDAT#1 and the second 4×-speed image signal IDAT#2. The original image signal RGB has the first image frequency, and the first 4×-speed image signal IDAT#1 and the second 4×-speed image signal IDAT#2 each has the second image frequency which is four times the first image frequency, as described above.

The original image signal RGB and the first 4×-speed image signal IDAT#1 and the second 4×-speed image signal IDAT#2 will now be described in further detail with reference to FIGS. 4A and 4B. Referring to FIGS. 4A and 4B, the original image signal RGB may have a frequency of 60 Hz, and each of the first 4×-speed image signal IDAT#1 and the second 4×-speed image signal IDAT#2 may have a frequency of 240 Hz. In FIGS. 4A and 4B, a previous frame of the original image signal RGB, e.g., an (n−1)-th frame, is denoted by reference character "frm1", and a current frame e.g., an immediately subsequent and adjacent frame to the (n−1)-th frame, of the original image signal RGB, e.g., an n-th frame, is denoted by reference character "frm2".

In FIG. 4A, frames, each having an object OBJ, included in the original image signal RGB are output at intervals of 1/60 second. In FIG. 4B, frames included in each of the first 4×-speed image signal IDAT#1 and the second 4×-speed image signal IDAT#2 are output at intervals of 1/240 second. Each of the first 4×-speed image signal IDAT#1 and the second 4×-speed image signal IDAT#2 may include a ¼-th interpolated frame, a ½-th interpolated frame, and a ¾-th interpolated frame inserted between the previous and current frames (e.g., the (n−1)-th and n-th frames frm1 and frm2, respectively,) of the original image signal RGB.

As shown in FIG. 4B, the ¼-th interpolated frame, the ½-th interpolated frame, and the ¾-th interpolated frame are labeled with reference characters "frm1.25," "frm1.5," and "frm1.75," respectively. The ½-th interpolated frame frm1.5 is inserted halfway between the (n−1)-th frame frm1 and the n-th frame frm2, the ¼-th interpolated frame frm1.25 is inserted halfway between the (n−1)-th frame frm1 and the ½-th interpolated frame frm1.5, and the ¾-th interpolated frame frm1.75 is inserted halfway between the ½-th interpolated frame frm1.5 and the n-th frame frm2. When interpolated frames (such as the interpolated frames frm1.25, frm1.5 and frm1.75, for example) are inserted between original frames (such as the frames frm1 and frm2, for example) as described above, a display quality of the display device 10 according to an exemplary embodiment is substantially enhanced.

The image signal processor 600_1 will be described in further detail below with reference to FIG. 5.

Referring again to FIG. 3, the control signal generator 600_2 receive the external control signals (such as the data enable signal DE, the horizontal synchronization signal Hsync, the vertical synchronization signal Vsync and the main clock signal Mclk) from an external source (not shown) and outputs the gate control signals CONT1 and the data control signals CONT2.

The gate control signals CONT1 control the operation of the gate driver 400. The gate control signals CONT1 may include, for example, a vertical start signal STV for starting the gate driver 400, a gate clock signal CPV for determining when to output the gate-on voltage Von, and an output enable signal OE for determining the pulse width of the gate-on voltage Von. The data control signals CONT2 control the operation of the data driver 500. The data control signals CONT2 may include, for example, a horizontal start signal STH for starting the data driver 500 and an output instruction signal TP for instructing the output of an image data voltage.

Figure 5:
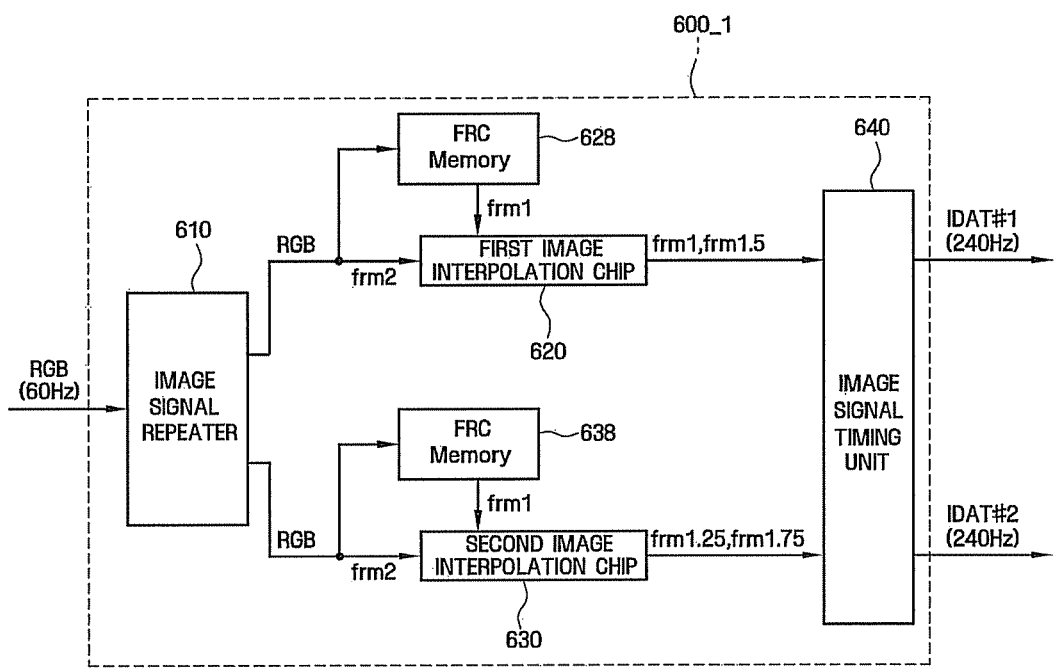
FIG. 5 is a block diagram of an exemplary embodiment of an image signal processor of the signal controller shown in FIG. 3.

FIG. 5 is a block diagram of an exemplary embodiment of the image signal processor 600_1 of the signal controller 600 shown in FIG. 3. Referring to FIG. 5, the image signal processor 600_1 includes an image interpolation unit (not separately labeled in FIG. 5), an image signal repeater 610 and an image signal timing unit 640. In an exemplary embodiment, the image interpolation unit includes a first image interpolation chip 620, a second image interpolation chip 630, a first frame rate compensation ("FRC") memory 628 and a second FRC memory 638.

The image signal repeater 610 receives the original image signal RGB and delivers the original image signal RGB to the first image interpolation chip 620 and the second image interpolation chip 630.

The previous frame (e.g., the (n−1)-th frame frm1) included in the original image signal RGB is stored in the first FRC memory 628 and the second FRC memory 638.

The image interpolation unit receives the original image signal RGB and outputs the ¼-th interpolated frame frm1.25, the ½-th interpolated frame frm1.5, and the ¾-th interpolated frame frm1.75, which are inserted between the (n−1)-th and n-th frames frm1 and frm2 of the original image signal RGB, and the (n−1)-th frame frm1.

Here, the first image interpolation chip 620 and the second image interpolation chip 630 receive the original image signal RGB corresponding to the (n−1)-th frame frm1 and the n-th frame frm2 and output a double-("2×")-speed image signal having at least one interpolated frame therein.

The first image interpolation chip 620 may receive an original image signal corresponding to a current frame (e.g., the n-th frame frm2) from the image signal repeater 610 and may read an original image signal corresponding to a previous frame (e.g., the (n−1)-th frame frm1) from the first FRC memory 628. Thus, the first image interpolation chip 620 receives the original image signal RGB corresponding to the (n−1)-th frame frm1 and the n-th frame frm2.

Likewise, the second image interpolation chip 630 may receive the original image signal corresponding to the current frame (e.g., the n-th frame frm2) from the image signal repeater 610 and may read the original image signal corresponding to the previous frame (e.g., the (n−1)-th frame frm1) from the second FRC memory 638. As a result, the second image interpolation chip 630 receives the original image signal RGB corresponding to the (n−1)-th frame frm1 and the n-th frame frm2.

The first image interpolation chip 620 and the second image interpolation chip 630 output image signals corresponding to two different ones of the (n−1)-th frame frm1, the ½-th interpolated frame frm1.5, the ¼-th interpolated frame frm1.25 and the ¾-th interpolated frame frm1.75. Referring still to FIG. 5, the first image interpolation chip 620 outputs two frames including an interpolated frame, e.g., the (n−1)-th frame frm1 and the ½-th interpolated frame frm1.5. In addition, the second image interpolation chip 630 may output two different interpolated frames, e.g., the ¼-th interpolated frame frm1.25 and the ¾-th interpolated frame frm1.75.

The image signal timing unit 640 may receive four frames (e.g., the (n−1)-th frame frm1, the ¼-th interpolated frame frm1.25, the ½-th interpolated frame frm1.5, and the ¾-th interpolated frame frm1.75) from the first image interpolation chip 620 and the second image interpolation chip 630 and deliver the first 4×-speed image signal IDAT#1 and the second 4×-speed image signal IDAT#2 to the data driver 500 (FIG. 1).

The image signal timing unit 640 corrects a gray level of each of the four frames (e.g., the (n−1)-th frame frm1, the ¼-th interpolated frame frm1.25, the ½-th interpolated frame frm1.5, and the ¾-th interpolated frame frm1.75) received from the first image interpolation chip 620 and the second image interpolation chip 630 based on a relationship between a gray level of a previous (n−10-th frame and a gray level of the current n-th frame. In addition, the image signal timing unit 640 outputs the four corrected frames (e.g., a corrected (n−1)-th frame frm1', a corrected ¼-th interpolated frame frm1.25', a corrected ½-th interpolated frame frm1.5' and a corrected ¾-th interpolated frame frm1.75'), each having a correction coefficient, as the first 4×-speed image signal IDAT#1 and the second 4×-speed image signal IDAT#2. Put another way, each frame of each of both the first 4×-speed image signal IDAT#1 and the second 4×-speed image signal IDAT#2 provided by the image signal timing unit 640 may have a correction coefficient. The image signal timing unit 640 will be described in further detail below with reference to FIG. 9.

Figure 6A:
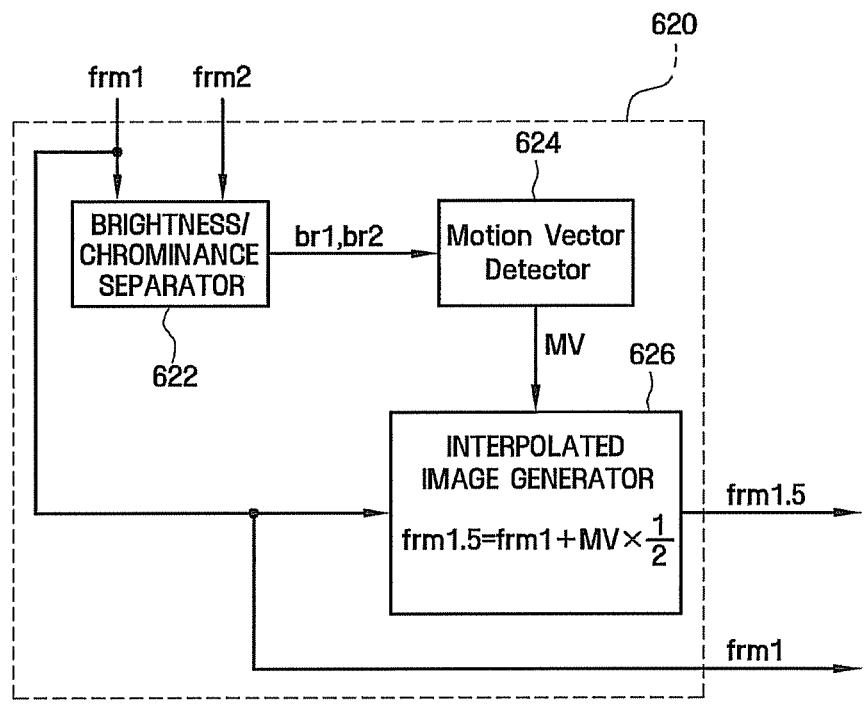
FIG. 6A is a block diagram of an exemplary embodiment of a first image interpolation chip of the image signal processor shown in FIG. 5.
Figure 6B:
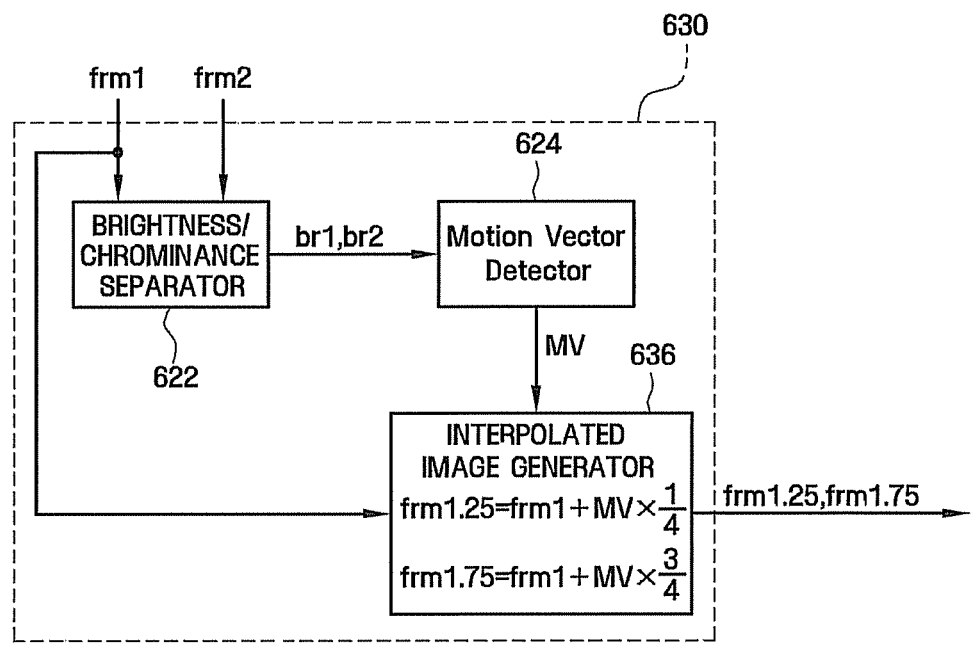
FIG. 6B is a block diagram of an exemplary embodiment of a second image interpolation chip of the image signal processor shown in FIG. 5.

FIG. 6A is a block diagram of an exemplary embodiment of the first image interpolation chip 620 of the image signal processor 600 shown in FIG. 5, and FIG. 6B is a block diagram of an exemplary embodiment of the second image interpolation chip 630 of the image signal processor 600 shown in FIG. 5.

Referring to FIGS. 6A and 6B, the first image interpolation chip 620 and the second image interpolation chip 630 may calculate a motion vector MV of a same object OBJ by comparing the previous (n−1)-th frame frm1 with the current n-th frame frm2 and output interpolated frames (e.g., the ¼-th interpolated frame frm1.25, the ½-th interpolated frame frm1.5, and the ¾-th interpolated frame frm1.75) based on the motion vector MV calculated by the first image interpolation chip 620 and/or the second image interpolation chip 630.

The first image interpolation chip 620 may include a brightness/chrominance separator 622, a motion vector detector 624 and an interpolated image generator 626. Similarly, the second image interpolation chip 630 may include a brightness/chrominance separator 622, a motion vector detector 624 and an interpolated image generator 636.

The brightness/chrominance separator 622 of the first image interpolation chip 620 and the second image interpolation chip 630 may separate an image signal corresponding to each of the previous (n−1)-th frame frm1 and the current n-th frame frm2 into a first brightness component br1 and a second brightness component br2, as well as chrominance components (not shown). A brightness component of an image signal, e.g., the first brightness component br1 and the second brightness component br2, each has brightness information, and a corresponding chrominance component has color information.

The motion vector detector 624 of the first image interpolation chip 620 and the second image interpolation chip 630 calculates the motion vector MV of the same object OBJ by comparing the previous (n−1)-th frame frm1 with the current n-th frame frm2. For example, the motion vector detector 624 may receive the first brightness component br1 of an image signal, which corresponds to the previous (n−1)-th frame frm1, and the second brightness component br2 of an image signal, which corresponds to the current n-th frame frm2, and calculate the motion vector MV of the same object OBJ based thereon.

In an exemplary embodiment, the motion vector MV is a physical quantity which represents motion of the object OBJ contained in images. More particularly, the motion vector detector 624 may analyze the first brightness component br1 of the image signal of the previous (n−1)-th frame frm1 and the second brightness component br2 of the image signal of the n-th frame frm2 and determine whether respective regions of the (n−1)-th frame frm1 and the n-th frame frm2, which have a predetermined amount of matching brightness distributions, correspond to a position at which the same object OBJ is displayed. Based on the motion of the object OBJ between the previous (n−1)-th frame frm1 and the current n-th frame frm2, the motion vector detector 624 extracts the motion vector MV of the object OBJ, which will be described in greater detail below with reference to FIG. 7.

The interpolated image generator 626 of the first image interpolation chip 620 calculates the position of the object OBJ in the ½-th interpolated frame frm1.5 by using the motion vector MV calculated by the motion vector detector 624. In addition, the interpolated image generator 636 of the second image interpolation chip 630 may calculate the position of the object OBJ in the ¼-th interpolated frame frm1.25 and the ¾-th interpolated frame frm1.75 by using the motion vector MV calculated by the motion vector detector 624. The interpolated image generator 626 of the first image interpolation chip 620 may output the (n−1)-th frame frm1 and the ½-th interpolated frame frm1.5, and the interpolated image generator 636 of the second image interpolation chip 630 may output the ¼-th interpolated frame frm1.25 and the ¾-th interpolated frame frm1.75.

In an exemplary embodiment, the interpolated image generator 626 of the first image interpolation chip 620 and the interpolated image generator 636 of the second image interpolation chip 630 may assign different weights to the motion vector MV to generate the interpolated frames. The interpolated image generator 626 of the first image interpolation chip 620 may assign a weight of ½ to the motion vector MV to generate the ½-th interpolated frame frm1.5, and the interpolated image generator 636 of the second image interpolation chip 630 may assign weights of ¼ and ¾ to the motion vector MV and generate the ¼-th interpolated frame frm1.25 and the ¾-th interpolated frame frm1.75, respectively.

A process by which the interpolated image generator 626 and the interpolated image generator 636 calculate the motion vector MV and generates interpolated frames (such as the ¼-th interpolated frame frm1.25, the ½-th interpolated frame frm1.5, and the ¾-th interpolated frame frm1.75) by using the calculated motion vector MV will now be described in further detail with reference to FIGS. 7 and 8.

Figure 7:
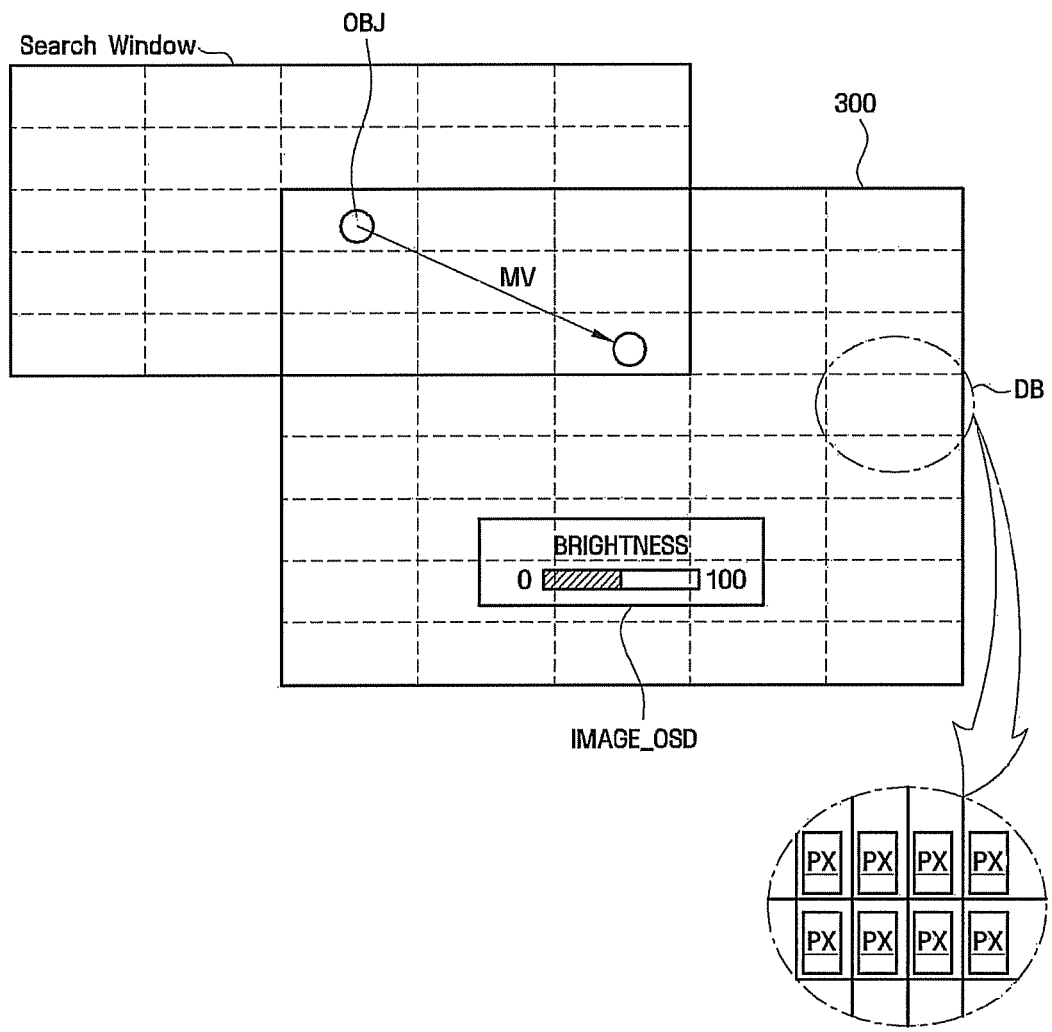
FIG. 7 is a block diagram of the display device shown in FIG. 1 for explaining an exemplary embodiment of a process of calculating a motion vector by using each of the first image interpolation chip and the second image interpolation chip of the image signal processor shown in FIG. 5.

FIG. 7 is a block diagram of the display device 10 shown in FIG. 1 for explaining an exemplary embodiment of a process of calculating the motion vector MV by using each of the first image interpolation chip 620 and the second image interpolation chip 630 of the image signal processor 600 shown in FIG. 5. FIG. 8 is a signal timing diagram for explaining an exemplary embodiment of a process of generating interpolated frames using the motion vector MV calculated in the process shown in FIG. 7.

Referring to FIG. 7, the display panel 300 according to an exemplary embodiment includes the display blocks DB, each having the plurality of the pixels PX disposed therein in a substantially matrix pattern. Thus, the display panel 300 is divided into the display blocks DB, indicated by dotted lines in FIG. 7, and each of the display blocks DB includes the pixels PX.

The first image interpolation chip 620 and the second image interpolation chip 630 (FIG. 5) detect the same object OBJ by comparing the original image signal of the previous (n−1)-th frame frm1 and the original image signal of the current n-th frame frm2 which correspond to each of the display blocks DB. To detect the same object OBJ in the previous (n−1)-th frame frm1 and the current n-th frame frm2, a sum of absolute difference ("SAD") technique may be used. More particularly, SAD is a method of adding absolute values of brightness differences between matching pixels PX and determining display blocks DB which have a smallest sum of the absolute values as matching blocks.

Thus, matching blocks of the previous (n−1)-th frame frm1 and the current n-th frame frm2 are determined using SAD and search windows. Each search window includes a portion of the display blocks DB of the display panel 300, and the same object OBJ is detected in the previous (n−1)-th frame frm1 and the current n-th frame frm2.

As shown in FIG. 7, a moving circular object OBJ and a stationary on-screen display ("OSD") image IMAGE_OSD may initially be detected as an object in the previous (n−1)-th frame frm1 and the current n-th frame frm2. In FIG. 7, the motion vector MV of the circular object OBJ is indicated by an arrow, and, as above, the OSD image IMAGE_OSD is a stationary object. Hence, the motion vector MV of the stationary object, e.g., the OSD image IMAGE_OSD, between the previous (n−1)-th frame frm1 and the current n-th frame frm2 is zero (0).

Figure 8:
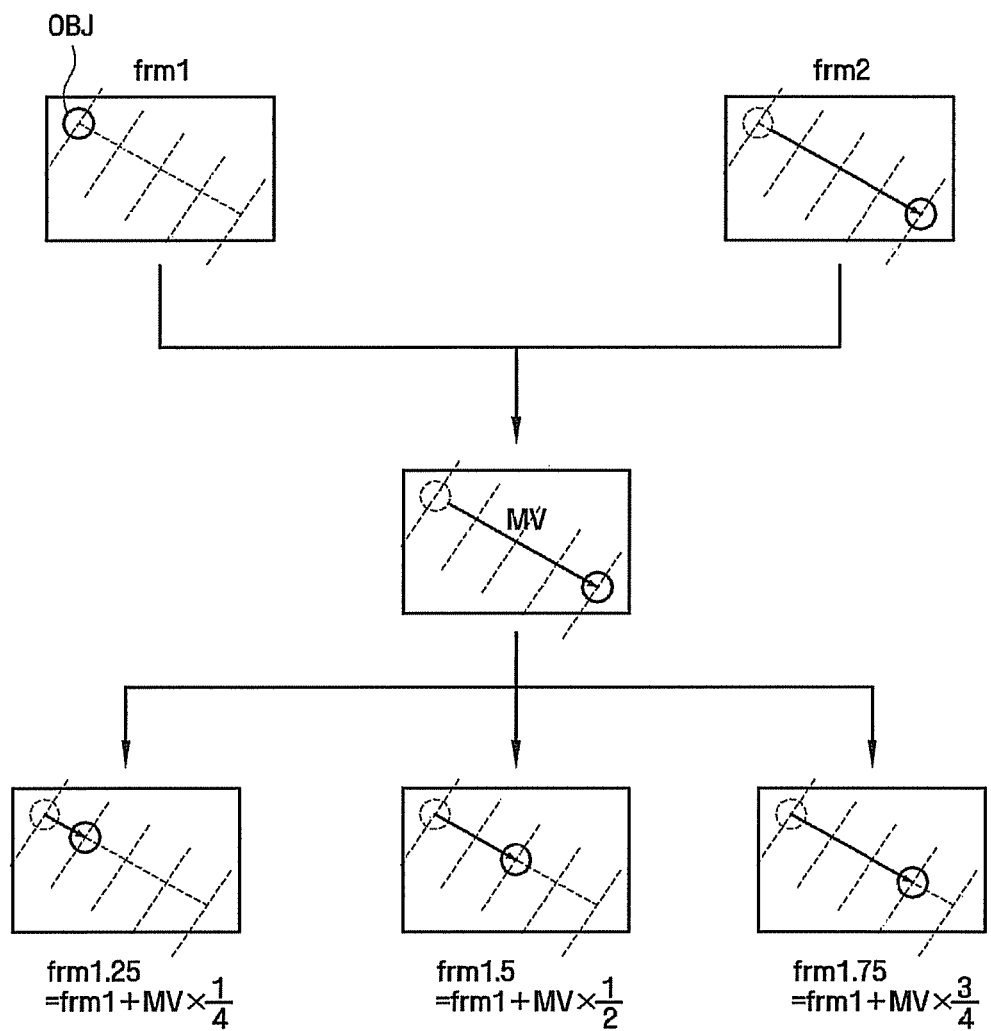
FIG. 8 is a signal timing diagram for explaining an exemplary embodiment of a process of generating interpolated frames by using the motion vector calculated using each of the first image interpolation chip and the second image interpolation chip of the image signal processor shown in FIG. 5.

Referring to FIG. 8, interpolated frames are generated by assigning different weights to the motion vector MV calculated based on the previous (n−1)-th frame frm1 and the current n-th frame frm2. As described in greater detail above, weights of ¼, ½ and ¾ are assigned to the motion vector MV to generate the ¼-th interpolated frame frm1.25, the ½-th interpolated frame frm1.5, and the ¾-th interpolated frame frm1.75, respectively.

Figure 9:
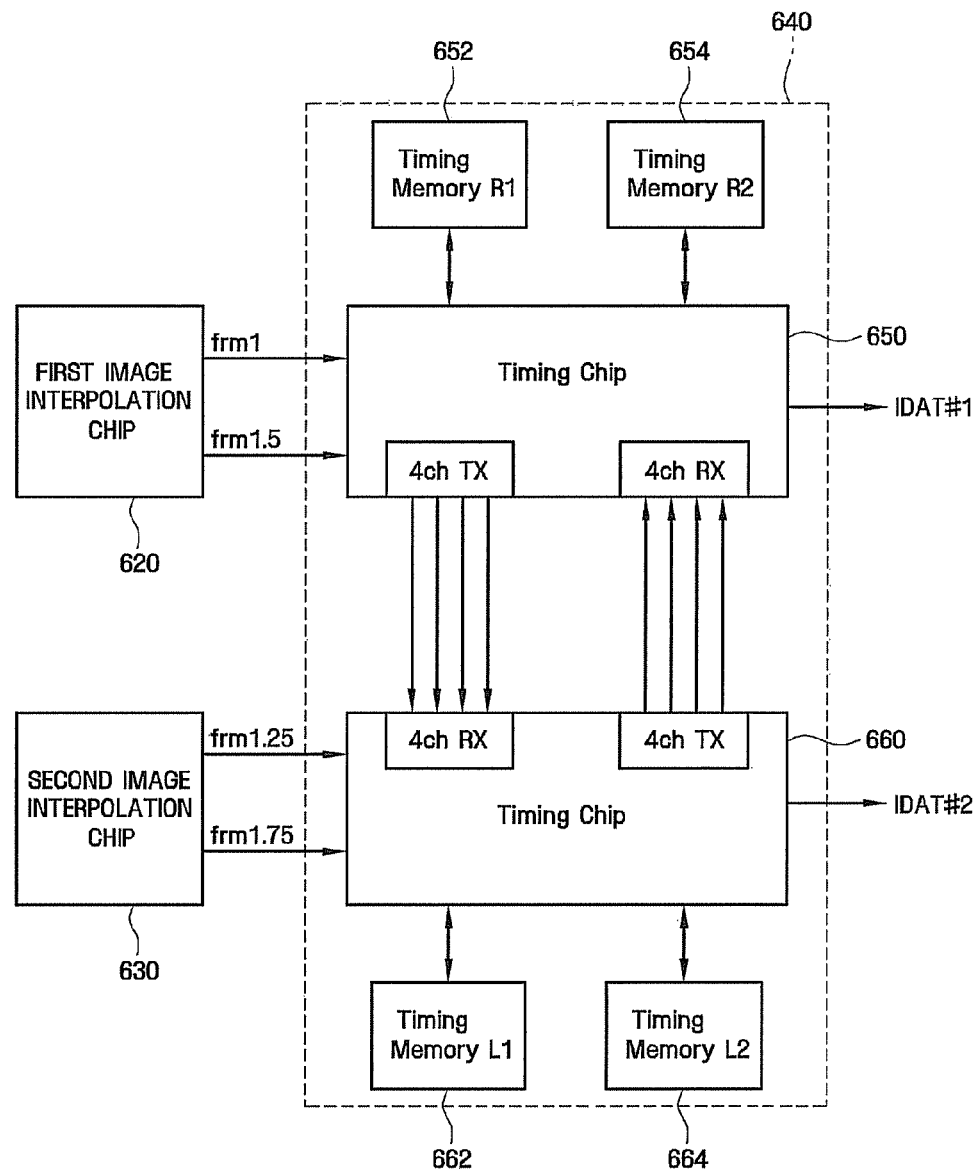
FIG. 9 is a block diagram of an exemplary embodiment of an image signal timing unit of the image signal processor shown in FIG. 5.

FIG. 9 is a block diagram of an exemplary embodiment of the image signal timing unit 640 of the image signal processor 600 shown in FIG. 5. For ease of description, the first image interpolation chip 620 and the second image interpolation chip 630 are both illustrated in FIG. 9, and any repetitive detailed description of the same or like components therein will hereinafter be omitted.

Referring to FIG. 9, the image signal timing unit 640 according to an exemplary embodiment includes a first timing unit and a second timing unit (neither individually labeled in FIG. 9). The first timing unit includes a first timing chip 650, a first timing memory ("R1") 652 and a second timing memory ("R2") 654, and the second timing unit includes a second timing chip 660, a first timing memory ("L1") 662 and a second timing memory ("L2") 664.

The first timing unit receives two frames (e.g., the previous (n−1)-th frame frm1 and the ½-th interpolated frame frm1.5) from the first image interpolation chip 620 and outputs first the 4×-speed image signal IDAT#1 to the pixels PX included in the first display region DPR I (FIG. 1).

The second timing unit receives two different interpolated frames (e.g., the ¼-th interpolated frame frm1.25 and the ¾-th interpolated frame frm1.75) from the second image interpolation chip 630 and outputs the second 4×-speed image signal IDAT#2 to the pixels PX included in the second display region DPR I (FIG. 1).

During a period, the first timing unit receives the two frames (e.g., the previous (n−1)-th frame frm1 and the ½-th interpolated frame frm1.5) at a same time, and the second timing unit receives the two different interpolated frames (e.g., the ¼-th interpolated frame frm1.25 and the ¾-th interpolated frame frm1.75) at the same time. In an exemplary embodiment, the period may be a period of time which corresponds to a reciprocal of the image frequency of the original image signal RGB, e.g., when the original image signal RGB has a frequency of 60 Hz, the period is $\frac{1}{60}^{th}$ second.

The first timing unit and the second timing unit each receive two frames, and may exchange data related to the first display region DPR I and the second DPR II (see FIG. 1). The first timing unit transmits data regarding the second display region DPR II (FIG. 1) for each of the two frames (e.g., previous the (n−1)-th frame frm1 and the ½-th interpolated frame frm1.5) received from the first image interpolation chip 620 to the second timing unit, while the second timing unit transmits data regarding the first display region DPR I (FIG. 1) for each of the two interpolated frames (e.g., the ¼-th interpolated frame frm1.25 and the ¾-th interpolated frame frm1.75) to the first timing unit.

To exchange the data regarding the first display region DPR I and the second display region DPR II (FIG. 1), the first timing unit and the second timing unit may include a 4-channel transmitter pin 4*ch* Tx and a 4-channel receiver pin 4*ch* Rx.

Figure 10:
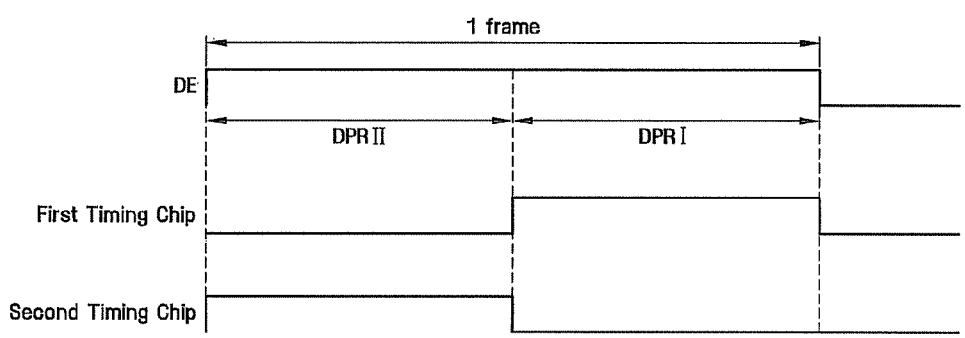
FIG. 10 is a signal timing diagram for explaining data exchange between exemplary embodiments of a first timing chip and a second timing chip of the image signal timing unit shown in FIG. 9.

FIG. 10 is a signal timing diagram for explaining data exchange between the first timing chip 650 and the second timing chip 660 of the image signal timing unit 640 shown in FIG. 9. In FIG. 10, reference character "DE" represents the data enable signal DE for indicating a region in which data is to be outputted.

Referring to FIGS. 9 and 10, the first timing unit and the second timing unit selectively receive data through the 4-channel transmitter pin 4*ch* Tx and the 4-channel receiver pin 4*ch* Rx. In a frame, a portion of the data enable signal DE during which the data enable signal DE is at a high level is divided into two parts. Then, the data on the second display region DPR II is included in the first part of the section, and the data on the first display region DPR I is included in the second part of the section. Thus, the second timing chip 660 selectively receives the data for the second display region DPR II, and the first timing chip 650 selectively receives the data for the first display region DPR I.

After selectively receiving the data on the first display region DPR I, the first timing chip 650 may process the data and output the first 4x-speed image signal IDAT#1. After selectively receiving the data on the second display region DPR II, the second timing chip 660 may process the data and output the second 4x-speed image signal IDAT#2.

Processing the data for the first region DPR I using the first timing chip 650 and processing the data on the second display region DPR II using the second timing chip 660 will now be described in further detail with reference to FIG. 9.

The first timing unit may correct the gray level of each of the previous (n−1)-th frame frm1, the ¼-th interpolated frame frm1.25, the ½-th interpolated frame frm1.5, and the ¾-th interpolated frame frm1.75 of the first display region DPR I based on a relationship between the gray level of the previous (n−1)-th frame and that of the current n-th frame. Hereinafter, the abovementioned correction operation will be referred to as a "gray correction of a current frame." After a gray correction of a current frame, the first timing unit sequentially rearranges the corrected previous (n−1)-th frame frm1', the corrected ¼-th interpolated frame frm1.25', the corrected ½-th interpolated frame frm1.5', and the corrected ¾-th interpolated frame frm1.75', and outputs the above-listed corrected frames during a period, e.g., during a period of time corresponding to the reciprocal of the image frequency of the original image signal RGB. Hereinafter, the above sequential rearrangement operation will be referred to as a "sequential rearrangement." As a result, each of the corrected previous (n−1)-th frame frm1', the corrected ¼-th interpolated frame frm1.25', the corrected ½-th interpolated frame frm1.5' and the corrected ¾-th interpolated frame frm1.75' are output during a quarter (¼) of the period, e.g., a period of time corresponding to the reciprocal of the image frequency of the first 4x-speed image signal IDAT#1 or the second 4x-speed image signal IDAT#2.

Likewise, the second timing unit corrects the gray level of each of the previous (n−1)-th frame frm1, the ¼-th interpolated frame frm1.25, the ½-th interpolated frame frm1.5, and the ¾-th interpolated frame frm1.75 of the second display region DPR II based on a relationship between the gray level of eth previous (n−1)-th frame and the gray level of the current n-th frame (gray correction of a current frame). Then, the second timing unit sequentially rearranges the corrected previous (n−1)-th frame frm1', the corrected ¼-th interpolated frame frm1.25', the corrected ½-th interpolated frame frm1.5' and the corrected ¾-th interpolated frame frm1.75', and outputs the above-mentioned corrected frames during a period, e.g., during a period of time corresponding to the reciprocal of the image frequency of the original image signal RGB (sequential rearrangement). Therefore, each of the corrected previous (n−1)-th frame frm1', the corrected ¼-th interpolated frame frm1.25', the corrected ½-th interpolated frame frm1.5', and the corrected ¾-th interpolated frame frm1.75' are output during a quarter of the period, e.g., a period of time corresponding to the reciprocal of the image frequency of the first 4x-speed image signal IDAT#1 or the second 4x-speed image signal IDAT#2.

Figure 11:
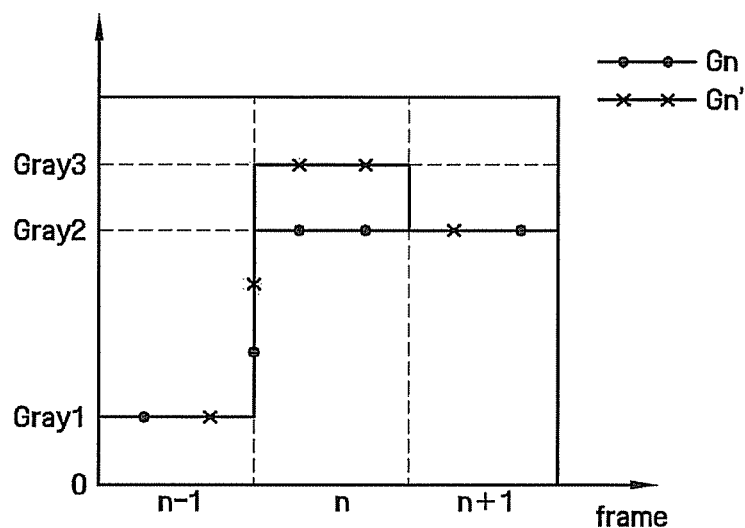
FIG. 11 is a signal timing diagram for explaining an exemplary embodiment of a process of correcting a gray level of a current frame using the first timing chip and the second timing chip of the of the image signal timing unit shown in FIG. 9.
Figure 12:
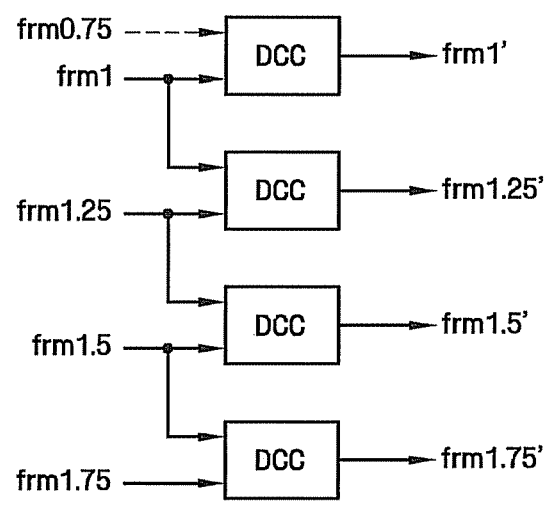
FIG. 12 is a block diagram which illustrates a relationship between frames before being corrected and frames after being corrected by the first timing chip and the second timing chip of the of the image signal timing unit shown in FIG. 9.

The gray correction of a current frame will now be described in further detail with reference to FIGS. 9, 11 and 12. FIG. 11 is a signal timing diagram for explaining an exemplary embodiment of a process of correcting the gray level of a current frame using the first timing chip 650 and the second timing chip 660 of the image signal timing unit 640 shown in FIG. 9. FIG. 12 is a block diagram which illustrates a relationship between frames before being corrected and frames after being corrected by the first timing chip 650 and the second timing chip 660 of the image signal timing unit 640 shown in FIG. 9.

FIG. 11 illustrates an uncorrected gray level Gn of a current n-th frame and a corrected gray level Gn' of the current n-th frame. Referring to FIG. 11, when the gray level Gn of the current n-th frame is greater than a gray level of a previous (n−1)-th frame, the corrected gray level Gn' of the current n-th frame is greater than or equal to the uncorrected gray level Gn of the current n-th frame. In an exemplary embodiment, when the gray level Gn of the current n-th frame is less than a gray level of the previous (n−1)-th frame, the corrected gray level Gn' of the current n-th frame may be less than or equal to the uncorrected gray level Gn of the current n-th frame.

In FIG. 11, for example, the uncorrected gray level Gn significantly changes, e.g., increases, between the previous (n−1)-th frame and the current n-th frame. More particularly, the uncorrected gray level Gn of the previous (n−1)-th frame is a first gray level Gray1, and the uncorrected gray level Gn of each of the current n-th frame and a subsequent $(n+1)^{th}$ frame is a second gray level Gray2, which is greater than the first gray level Gray1. In addition, the corrected gray level Gn' of the current n-th frame is a third gray Gray3 which is greater than the uncorrected gray level Gn of the current n-th frame. Thus, the corrected gray levels Gn' of the previous (n−1)-th frame and the subsequent $(n+1)^{th}$ frame are the first gray level Gray1 and the second gray level Gray2, respectively, and the corrected gray level Gn' of the current n-th frame is the third gray level Gray3, which is greater than the second gray level Gray2, as shown in FIG. 11.

When an image signal is corrected to have the third gray level Gray3, which is greater than the second gray level Gray2, in the current n-th frame as described above, a greater image data voltage is applied to the liquid crystal capacitor Clc (FIG. 2) than when the image signal is not corrected. Moreover, the greater the image data voltage that is applied to the liquid crystal capacitor Clc, the shorter the time required to charge the liquid crystal capacitor Clc with the image data voltage (known as "dynamic capacitance compensation ('DCC')"). Thus, as the image data voltage increases, a response time of liquid crystal molecules in an LCD 10 according to an exemplary embodiment is substantially reduced, thereby substantially improving a display quality of the same.

DCC, as described above in greater detail with reference to FIG. 11, corrects a gray level of a current n-th frame based on a relationship between a previous (n−1)-th frame and the current n-th frame. Referring now to FIG. 12, the gray level of the previous (n−1)-th frame frm1 corrected based on a previous frame (e.g., a frame frm0.75) of the (n−1)-th frame frm1 to output the corrected previous (n−1)-th frame frm1', and the gray level of the ¼-th interpolated frame frm1.25 may be corrected based on a previous frame (e.g., the (n−1)-th frame frm1) of the ¼-th interpolated frame frm1.25 to output the corrected ¼-th interpolated frame frm1.25'. In addition, the gray level of the ½-th interpolated frame frm1.5 may be corrected based on a previous frame (e.g., the ¼-th interpolated frame frm1.25) of the ½-th interpolated frame frm1.5 to output the corrected ½-th interpolated frame frm1.5', and the gray level of the ¾-th interpolated frame frm1.75 may be corrected based on a previous frame (e.g., the ½-th interpolated frame frm1.5) of the ¾-th interpolated frame frm1.75 to output the corrected ¾-th interpolated frame frm1.75'.

In an exemplary embodiment, data is simultaneously provided, in units of four frames, to the first timing chip 650 and the second timing chip 660. Thus, four frames (e.g., frames frm0, frm0.25, frm0.5, and frm0.75) are simultaneously input to the first timing chip 650 and the second timing chip 660 during a period (e.g., for 1/60 second, when the original image signal RGB has an image frequency of 60 Hz), and another four frames (e.g., frames frm1, frm1.25, frm1.5, and frm1.75) are simultaneously input to the first timing chip 650 and the second timing chip 660 during a next period (e.g., for 1/60 second), and yet another four frames (e.g., frames frm2, frm2.25, frm2.5, and frm2.75) are simultaneously input to the first timing chip 650 and the second timing chip 660 during the next period.

As shown in FIG. 12, frames frm0.75 and frm1 are in a same time slot to output the corrected previous (n−1)-th frame frm1'. Likewise, frames frm1.75 and frm2 are in a same time slot to output the corrected current n-th frame frm2'. As described above, frames frm0, frm0.25, frm0.5, and frm0.75 are simultaneously input to the first timing chip 650 and the second timing chip 660 during a period, while frames frm1, frm1.25, frm1.5, and frm1.75 are simultaneously input to the first timing chip 650 and the second timing chip 660 during a next period, and frames frm2, frm2.25, frm2.5, and frm2.75 are simultaneously input to the first timing chip 650 and the second timing chip 660 during the next period. Thus, in an exemplary embodiment, since the frames frm0.75 and frm1 are not input in the same time slot and the frames frm1.75 and frm2 are not input in the same time slot, frame*.75 (where "*" is a placeholder such that "frm*.75) indicates, frames frm0.75 and frm1.75, for example) are written and then read again for DCC on frame*.0 (e.g., frames frm0 and frm1).

Figure 13:
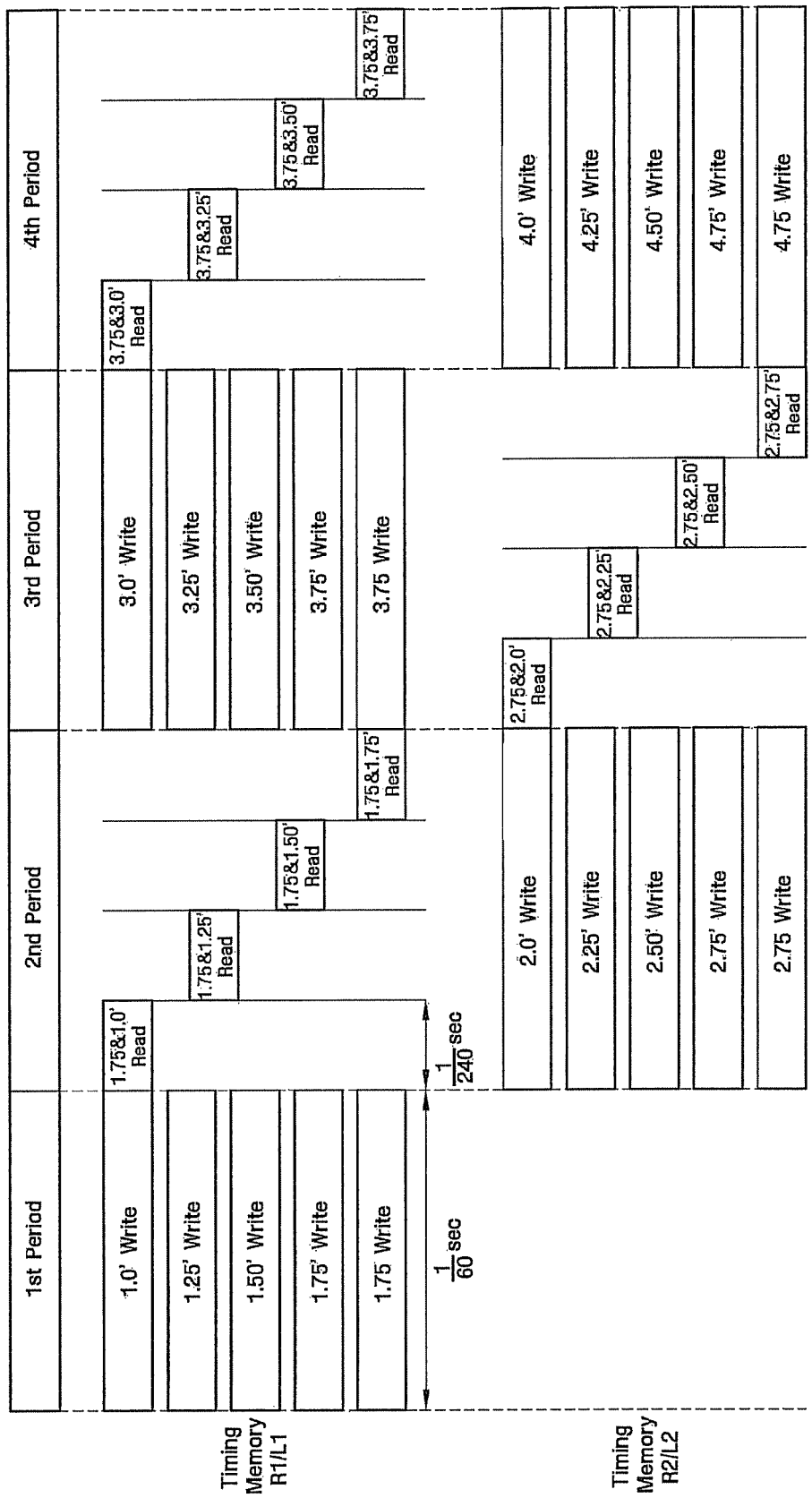
FIG. 13 is a signal timing diagram for explaining a read operation and a write operation the first timing chip and the second timing chip to and from memories of the of the image signal timing unit shown in FIG. 9.

FIG. 13 is a signal timing diagram for explaining an exemplary embodiment of a read operation and a write operation of each of the first timing chip 650 and the second timing chip 660 to and from the first timing memory (R1) 652 or the first timing memory (L1) 662 and the second timing memory (R2) 654 or (L2) 664 of the image signal timing unit 640 shown in FIG. 9.

The process of writing frame*.75 and then reading frame*.75 for DCC on frame*.0 will now be described in further detail with reference to FIGS. 9 and 13. In an exemplary embodiment, the first timing unit and the second timing unit use a same memory for gray correction of a current frame and sequential rearrangement as follows.

When a period is defined as a period of time corresponding to the reciprocal of the image frequency of the original image signal RGB, four frames, e.g., the previous (n−1)-th frame frm1, the 1/4-th interpolated frame frm1.25, the 1/2-th interpolated frame frm1.5, and the 3/4-th interpolated frame frm1.75, are simultaneously input to the first timing chip 650 and the second timing chip 660 during the period.

The first timing chip 650 may perform the write operation and the read operation to and from the first timing memory (R1) 652 and the second timing memory (R2) 654 in alternate periods. In addition, the second timing chip 660 may perform the write operation and the read operation to and from the first timing memory (L1) 662 and the second timing memory (L2) 664 in alternate periods.

In each odd-numbered period (e.g., first and third periods), the first timing chip 650 and the second timing chip 660 may write the corrected previous (n−1)-th frame frm1', the corrected 1/4-th interpolated frame frm1.25', the corrected 1/2-th interpolated frame frm1.5', the corrected 3/4-th interpolated frame frm1.75', and the 3/4-th interpolated frame frm1.75 to a corresponding one of the first timing memories 652 and 662. In FIG. 13, the above frames are indicated by "1.0' Write", "1.25' Write", "1.5' Write", "1.75' Write", and "1.75 Write", respectively, in the first period and by "3.0' Write", "3.25' Write", "3.5' Write", "3.75' Write", and "3.75 Write", respectively, in the third period. The 3/4-th interpolated frame is written for DCC during a next period, e.g., during each even-numbered period (e.g., second and fourth periods).

In each even-numbered period (e.g., the second and fourth periods), the first timing chip 650 and the second timing chip 660 sequentially read the corrected previous (n−1)-th frame frm1', the corrected 1/4-th interpolated frame frm1.25', the corrected 1/2-th interpolated frame frm1.5', and the corrected 3/4-th interpolated frame frm1.75' from the corresponding one of the first timing memories (R1) 652 and (L1) 662. Therefore, each of the corrected previous (n−1)-th frame frm1', the corrected 1/4-th interpolated frame frm1.25', the corrected 1/2-th interpolated frame frm1.5', and the corrected 3/4-th interpolated frame frm1.75' may be output during a quarter of each even-numbered period, e.g., during a period of time (such as 1/240 seconds) corresponding to the reciprocal of the image frequency of the first 4x-speed image signal IDAT#1 or the second 4x-speed image signal IDAT#2.

In FIG. 13, the above-mentioned frames are respectively indicated by "1.0' Read", "1.25' Read", "1.5' Read", and "1.75' Read" in the second period and by "3.0' Read", "3.25' Read", "3.5' Read", and "3.75' Read" in the fourth period. The first timing chip 650 and the second timing chip 660 also read the 3/4-th interpolated frame frm1.75 from the corresponding one of the first timing memories 652 (R1) and (L1) 662 over each even-numbered period. In FIG. 13, the 3/4-th interpolated frame frm1.75 is indicated by "1.75 Read" in the second period and by "3.75 Read" in the fourth period. Thus, the 3/4-th interpolated frame is read for DCC on frame*.0.

Similarly, in each even-numbered period (e.g., the second and fourth periods), the first timing chip 650 and the second timing chip 660 write the corrected previous (n−1)-th frame frm1', the corrected 1/4-th interpolated frame frm1.25', the corrected 1/2-th interpolated frame frm1.5', the corrected 3/4-th interpolated frame frm1.75', and the 3/4-th interpolated frame frm1.75 to a corresponding one of the second timing memories (R2) 654 and (L2) 664. In FIG. 13, the above frames are respectively indicated by "2.0' Write", "2.25' Write", "2.5' Write", "2.75' Write", and "2.75 Write" in the second period and by "4.0' Write", "4.25' Write", "4.5' Write", "4.75' Write", and "4.75 Write" in the fourth period. The 3/4-th interpolated frame frm1.75 is written for DCC during a next period, e.g., during each odd-numbered period (e.g., the third and fifth periods).

In each odd-numbered period (e.g., the third period and fifth periods), the first timing chip 650 and the second timing chip 660 sequentially read the corrected previous (n−1)-th frame frm1', the corrected 1/4-th interpolated frame frm1.25', the corrected 1/2-th interpolated frame frm1.5', and the corrected 3/4-th interpolated frame frm1.75' from the corresponding one of the second timing memories R2 654 and L2 664, respectively. Therefore, each of the corrected previous (n−1)-th frame frm1', the corrected 1/4-th interpolated frame frm1.25', the corrected 1/2-th interpolated frame frm1.5', and the corrected 3/4-th interpolated frame frm1.75' output during a quarter of each odd-numbered period, such as during a period of time (e.g., 1/240 second) corresponding to the reciprocal of the image frequency of the first 4x-speed image signal IDAT#1 or the second 4x-speed image signal IDAT#2.

In FIG. 13, the above-mentioned frames are respectively indicated by "2.0' Read", "2.25' Read", "2.5' Read", and "2.75' Read" in the third period. The first timing chip 650 and the second timing chip 660 also read the 3/4-th interpolated frame frm1.75 from the corresponding one of the second timing memories 654 R2 and 664 L2 over each odd-numbered period. In FIG. 13, the 3/4-th interpolated frame frm1.75 is indicated by "2.75 Read" in the third period. Thus, the ¾-th interpolated frame frm1.75 is read for DCC on frame*.0.

As described above, when data read from the first timing memory (R1) 652 or (L1) 662 and the second time memory (R2) 654 or (L2) 664 in an alternating manner, the first 4×-speed image signals IDAT#1 and the second 4×-speed image signal IDAT#2, which have gone through the gray correction of a current frame and sequential rearrangement, are outputted.

Figure 14:
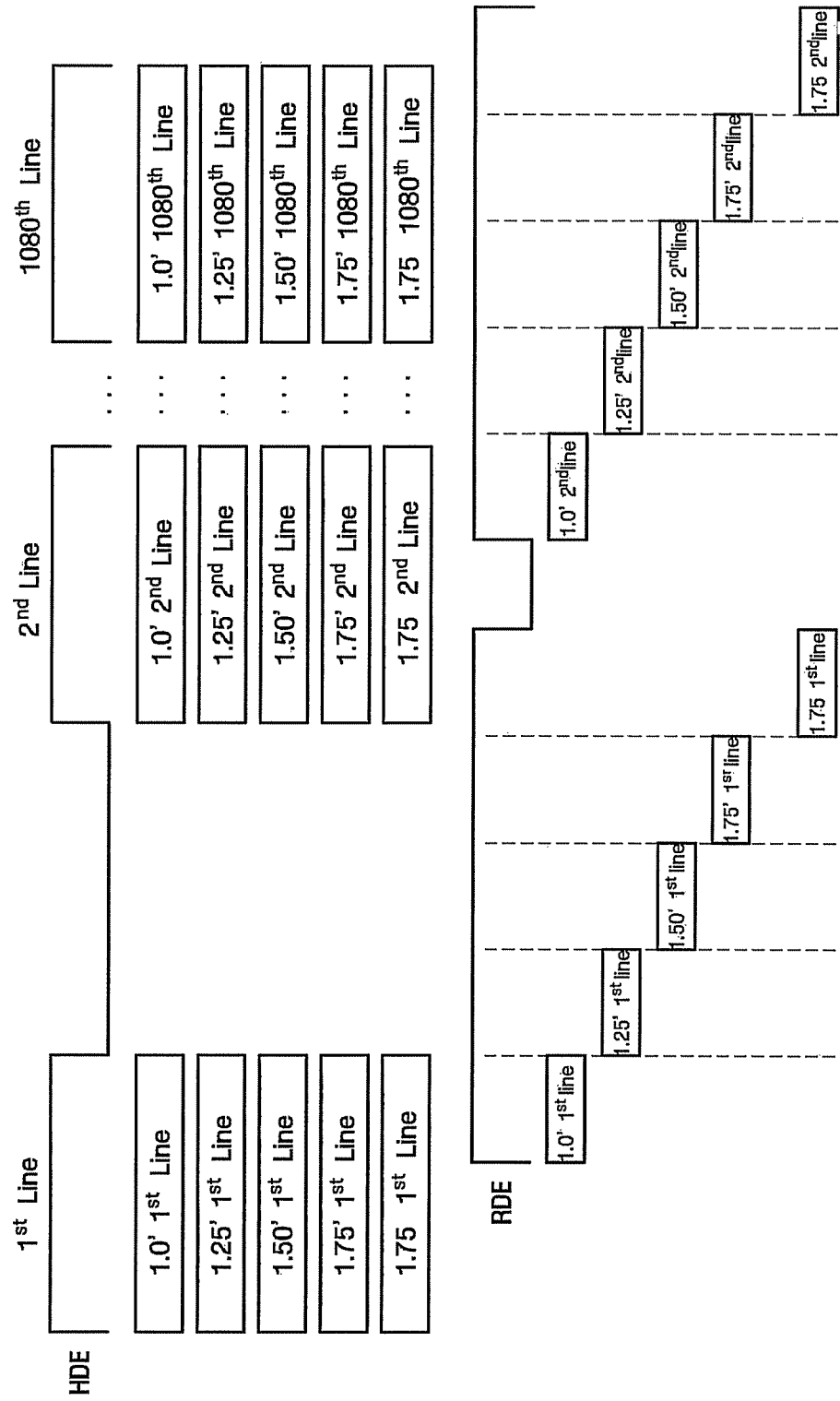
FIG. 14 is a signal timing diagram for explaining an exemplary embodiment of the write operation shown in FIG. 13.

FIG. 14 is a signal timing diagram for explaining an exemplary embodiment of the write operation shown in FIG. 13 in further detail. The timing diagram of FIG. 14 illustrates the write operation which is performed in units of rows during a period. As described above in further detail with reference to FIG. 1, the pixels PX are arranged in a substantially matrix pattern. Thus, the term "row" refers to rows of the matrix pattern. Moreover, in FIG. 14, "$1^{st}$ through $1080^{th}$ Lines" indicate 1080 rows of the matrix, respectively.

Referring to FIG. 14, in each high-level section of a first signal HDE, in which the first signal HDE is at a high level, data of five groups (e.g., the corrected previous (n−1)-th frame frm1', the corrected ¼-th interpolated frame frm1.25', the corrected ½-th interpolated frame frm1.5', and the corrected ¾-th interpolated frame frm1.75', and the uncorrected ¾-th interpolated frame frm1.75), which corresponds to each row of the matrix pattern is written.

As shown in FIG. 14, in a first high-level section of the first signal HDE, data of the five groups, which correspond to a first row of the matrix pattern, is written, as indicated by "1.0' $1^{st}$ Line", "1.25' $1^{st}$ Line", "1.5' $1^{st}$ Line", "1.75' $1^{st}$ Line", and "1.75 $1^{st}$ Line." In a second high-level section of the first signal HDE, data of the five data groups, which corresponds to a second row of the matrix pattern, is written as indicated by "1.0' $2^{nd}$ Line", "1.25' $2^{nd}$ Line", "1.5' $2^{nd}$ Line", "1.75' $2^{nd}$ Line", and "1.75 $2^{nd}$ Line". Accordingly, in a $1080^{th}$ high-level section of the first signal HDE, data of the five groups, which corresponds to a $1080^{th}$ row of the matrix, is written as indicated by "1.0' $1080^{th}$ Line", "1.25' $1080^{th}$ Line", "1.5' $1^{st}$ Line", "1.75' $1080^{th}$ Line", and "1.75 $1080^{th}$ Line".

Additionally, in an exemplary embodiment, in each high-level section of a second signal RDE, in which the second signal RDE is at a high level, the five groups (e.g., the corrected previous (n−1)-th frame frm1', the corrected ¼-th interpolated frame frm1.25', the corrected ½-th interpolated frame frm1.5', and the corrected ¾-th interpolated frame frm1.75', and the uncorrected ¾-th interpolated frame frm1.75) serially written in units of rows of the matrix pattern. In FIG. 14, in a first high-level section of the second signal RDE, the data of the five groups, which corresponds to the first row of the matrix, is serialized and written as indicated by "1.0' $1^{st}$ Line", "1.25' $1^{st}$ Line", "1.5' $1^{st}$ Line", "1.75' $1^{st}$ Line", and "1.75 $1^{st}$ Line." In a second high-level section of the second signal RDE, the data of the five groups, which corresponds to the second row of the matrix, is serialized and written as indicated by "1.0' $2^{nd}$ Line", "1.25' $2^{nd}$ Line", "1.5' $2^{nd}$ Line", "1.75' $2^{nd}$ Line", and "1.75 $2^{nd}$ Line."

Figure 15A:
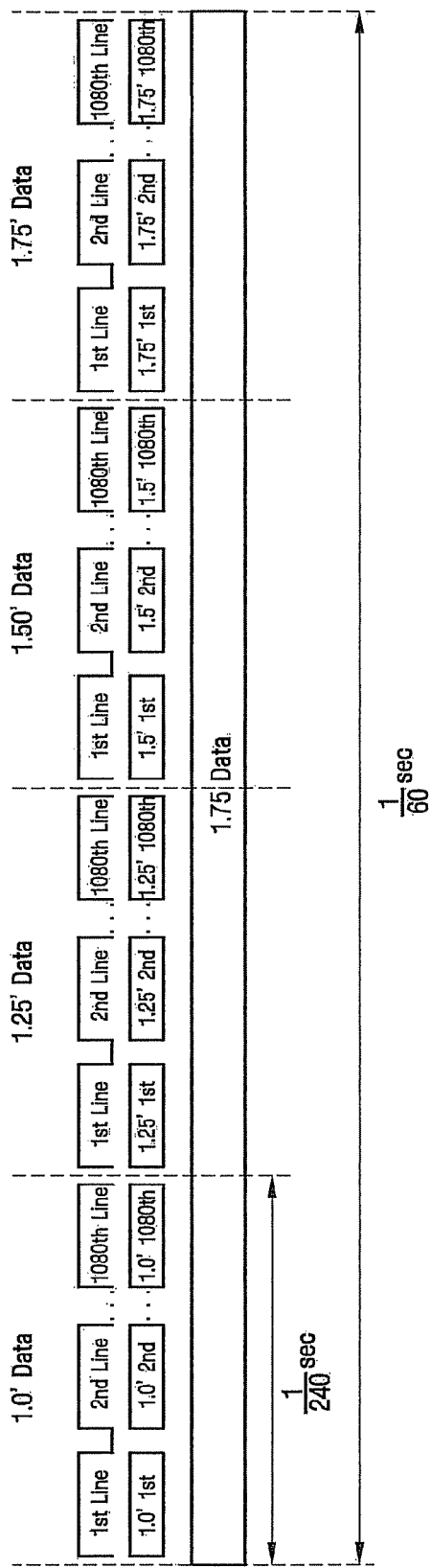
FIGS. 15A and 15B are signal timing diagrams for explaining an exemplary embodiment of the read operation shown in FIG. 13.
Figure 15B:
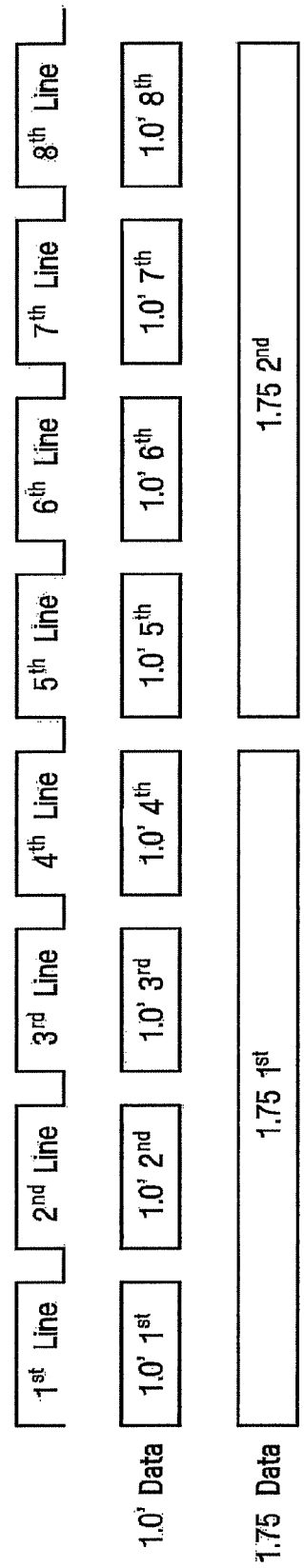

FIGS. 15A and 15B are signal timing diagrams for explaining an exemplary embodiment of the read operation shown FIG. 13 in further detail.

Referring to FIG. 15A, data of two groups, which was written in a previous period, is read. Hence, the two groups include a group of the ¾-th interpolated frame frm1.75 (indicated by reference character "1.75 Data" in FIGS. 15A and 15B) and another group of the corrected previous (n−1)-th frame frm1' (indicated by reference character "1.0' Data" in FIGS. 15A and 15B), the corrected ¼-th interpolated frame frm1.25' (indicated by reference character "1.25' Data" in FIGS. 15A and 15B), the corrected ½-th interpolated frame frm1.5' (indicated by reference character "1.5' Data" in FIGS. 15A and 15B), and the corrected ¾-th interpolated frame frm1.75' (indicated by reference character "1.75' Data" in FIGS. 15A and 15B).

In FIGS. 15A and 15B, "1.0'$1^{st}$ through 1.0' $1080^{th}$" indicate data of the corrected (n−1)-th frame frm1' (1.0' Data) which corresponds to the rows $1^{st}$ through $1080^{th}$ Lines of the matrix pattern, respectively, and "1.25' $1^{st}$ through 1.25' $1080^{th}$" indicate data of the corrected ¼-th interpolated frame frm1.25' (1.25' Data) which corresponds to the rows $1^{st}$ through $1080^{th}$ Lines of the matrix pattern, respectively. In addition, "1.5' $1^{st}$ through 1.5' $1080^{th}$" indicate data of the corrected ½-th interpolated frame frm1.5' (1.5' Data) which corresponds to the rows $1^{st}$ through $1080^{th}$ Lines of the matrix pattern, respectively, and "1.75' $1^{st}$ through 1.75' $1080^{th}$" indicate data of the corrected ¾-th interpolated frame frm1.75' (1.75' Data) which corresponds to the rows $1^{st}$ through $1080^{th}$ Lines of the matrix pattern, respectively.

While four rows of each of the corrected (n−1)-th frame frm1' (1.0' Data), the corrected ¼-th interpolated frame frm1.25' (1.25' Data), the corrected ½-th interpolated frame frm1.5' (1.5' Data), and the corrected ¾-th interpolated frame frm1.75' (1.75' Data) are read, a row of the ¾-th interpolated frame frm1.75 (1.75 Data) may be read. Referring to FIG. 15B, while four rows of the corrected (n−1)-th frame frm1' (1.0' Data) are read, a row of the ¾-th interpolated frame frm1.75 (1.75 Data) is read.

While first through fourth rows 1.0' $1^{st}$ through 1.0' $4^{th}$ of the corrected (n−1)-th frame frm1' (1.0' Data) are read, a first row 1.75 $1^{st}$ of the ¾-th interpolated frame frm1.75 (1.75 Data) is read. In addition, while fifth through eighth rows 1.0' $5^{th}$ through 1.0' $8^{th}$ of the corrected (n−1)-th frame frm1' (1.0' Data) are read, a second row 1.75 $2^{nd}$ of the ¾-th interpolated frame frm1.75 (1.75 Data) is read. In this way, while four rows of the corrected (n—1)-th frame frm1' (1.0' Data) are read, a row of the ¾-th interpolated frame frm1.75 (1.75 Data) is read. Consequently, the read, ¾-th interpolated frame frm1.75 (1.75 Data) is used for DCC on a frame 2.0 Data which is read from another timing memory.

As described above, each of the first and second timing chips 650 and 660 reads the corrected (n−1)-th frame frm1' (1.0' Data), the corrected ¼-th interpolated frame frm1.25' (1.25' Data), the corrected ½-th interpolated frame frm1.5' (1.5' Data), and the corrected ¾-th interpolated frame frm1.75 (1.75 Data) sequentially during a period while reading the uncorrected ¾-th interpolated frame over the period. To return the timing of the read operation, which is brought forward by the time saved due to such concurrent read operations, to normal timing, the first timing chip 650 and the second timing chip 660 may include a read buffer 672 (FIG. 16).

Figure 16:
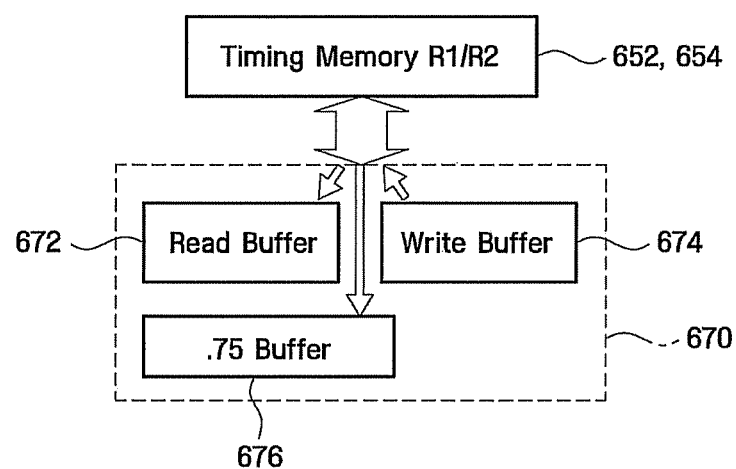
FIG. 16 is a block diagram of exemplary embodiments of line memories included in the first timing chip and the second timing chip of the of the image signal timing unit shown in FIG. 9.

FIG. 16 is a block diagram of exemplary embodiments of line memories included in the first timing chip 650 and the second timing chip 660 of the image signal timing unit 640 shown in FIG. 9. A memory control block 670 and the first and second timing memories (R1) 652 and (R2) 654, respectively, included in the first timing chip 650 (FIG. 9) will now be described in further detail with reference to FIG. 16. It will be noted that substantially same description applies to a memory control block (not shown) and the first and second timing memories (L1) 662 and (L2) 664, respectively, (FIG. 9) included in the second timing chip 660 (FIG. 9).

Referring to FIG. 16, the first timing chip 650 (FIG. 9) includes the memory control block 670 having line memories disposed therein. In the line memories, data is temporarily stored during the write operation and/or the read operation of the first timing chip 650, as described in greater detail above.

The line memories according to an exemplary embodiment include the read buffer 672, a write buffer 674 and a ¾-th buffer, e.g. a 0.75 buffer 676. The read buffer 672 and the write buffer 674 temporarily store the corrected previous (n−1)-th frame frm1', the corrected ¼-th interpolated frame frm1.25', the corrected ½-th interpolated frame frm1.5' and the corrected ¾-th interpolated frame frm1.75', and the ¾-th buffer 676 temporarily store the ¾-th interpolated frame frm1.75. Since frames are temporarily stored in the read buffer 672, the write buffer 674 and the ¾-th buffer 676, the first timing chip 650 and the second timing chip 660 access the frames substantially faster than when accessing frames stored in each of the first and second timing memories (R1) 652 and (R2) 654 or (L1) 662 and (L2) 664, respectively. Thus, the first timing chip 650 and the second timing chip 660 write and read data according to the timing sequence described in greater detail above and shown in FIGS. 13 through 15B.

As described herein, a display device according to an exemplary embodiment of the present invention perform gray correction of a current frame and sequential rearrangement using a same memory. Thus, a number of memories required in an LCD 10 is substantially reduced. In an exemplary embodiment, for example, only four memories, e.g., the first and second timing memories (R1) 652, (R2) 654, (L1) 662 and (L2) 664, are used as shown in FIG. 9.

In addition, since each timing chip performs gray correction of a current frame, as well as sequential rearrangement, a required number of required timing chips is also substantially reduced. In an exemplary embodiment, for example, two timing chips, e.g., the first timing chip 650 and the second timing chip 660, are used, as shown in FIG. 9. Since the number of memories and the number of chips is substantially reduced, a size of a control panel board assembly ("PBA") in the LCD 10 according to an exemplary embodiment is substantially reduced, which, in turn, substantially reduces manufacturing costs of the same.

Thus, according to exemplary embodiments of the present invention as described herein, a display device provides advantages which include, but are not limited to, substantially reduced manufacturing costs.

The present invention should not be construed as being limited to the exemplary embodiments set forth herein. Rather, these exemplary embodiments are provided so that this disclosure will be thorough and complete and will fully convey the concept of the present invention to those skilled in the art. For example, in an exemplary embodiment of the present invention, a method of driving a display panel having pixels includes: dividing the display panel into a first display region and a second display region; receiving an original image signal with a first image interpolation chip; inserting one of the ¼-th interpolated frame, a ½-th interpolated frame and a ¾-th interpolated frame between a previous (n−1)-th frame of the original image signal and a subsequent n-th frame of the original image signal with the first image interpolation chip; outputting the previous (n−1)-th frame of the original image signal and the one of the ¼-th interpolated frame, the ½-th interpolated frame and the ¾-th interpolated frame from the first image interpolation chip to a first timing unit; receiving the original image signal with a second image interpolation chip; outputting two of the ¼-th interpolated frame, the ½-th interpolated frame and the ¾-th interpolated frame from the second image interpolation chip to a second timing unit; outputting a first quadruple-speed image signal to the pixels in the first display region with the first timing unit; outputting a second quadruple-speed image signal to pixels in the second display region with the second timing unit; transmitting data corresponding to the previous (n−1)-th frame and the one of the ¼-th interpolated frame, the ½-th interpolated frame and the ¾-th interpolated frame from the first timing unit to the second timing unit; and transmitting data corresponding to the two of the ¼-th interpolated frame, the ½-th interpolated frame and the ¾-th interpolated frame from the second timing unit to the first timing unit. The first timing unit and the second timing unit include a timing chip, a first timing memory and a second timing memory While the present invention has been particularly shown and described with reference to exemplary embodiments thereof, the exemplary embodiments should be considered in a descriptive sense only and not for purposes of limitation, and it will be understood by those of ordinary skill in the art that various changes in form and detail may be made therein without departing from the spirit or scope of the present invention as defined by the following claims.

What is claimed is:

1. A display device comprising:
   a display panel comprising pixels and divided into a first display region and a second display region;
   a first image interpolation chip which receives an original image signal and only outputs a previous (n−1)-th frame of the original image signal and one of a ¼-th interpolated frame, a ½-th interpolated frame and a ¾-th interpolated frame, the one of the ¼-th interpolated frame, the ½-th interpolated frame and the ¾-th interpolated frame being inserted between the previous (n−1)-th frame of the original image signal and a current n-th frame of the original image signal;
   a second image interpolation chip which receives the original image signal and outputs two of the ¼-th interpolated frame, the ½-th interpolated frame and the ¾-th interpolated frame;
   a first timing unit which receives the previous (n−1)-th frame and the one of the ¼-th interpolated frame, the ½-th interpolated frame and the ¾-th interpolated frame from the first image interpolation chip and outputs a first quadruple-speed image signal to the pixels in the first display region; and
   a second timing unit which receives the two of the ¼-th interpolated frame, the ½-th interpolated frame and the ¾-th interpolated frame from the second image interpolation chip and outputs a second quadruple-speed image signal to pixels in the second display region, wherein
   the first timing unit transmits data corresponding to the previous (n−1)-th frame and the one of the ¼-th interpolated frame, the ½-th interpolated frame and the ¾-th interpolated frame to the second timing unit, and
   the second timing unit transmits data corresponding to the two of the ¼-th interpolated frame, the ½-th interpolated frame and the ¾-th interpolated frame to the first timing unit.

2. The display device of claim 1, wherein the first timing unit and the second timing unit comprise:
   at least one-channel transmitter pin; and
   at least one-channel receiver pin.

3. The display device of claim 1, wherein
   the first timing unit receives the previous (n−1)-th frame and the one of the ¼-th interpolated frame, the ½-th interpolated frame and the ¾-th interpolated frame from the first image interpolation chip simultaneously during a period,
   the first timing unit corrects a gray level of the previous (n−1)-th frame, the ¼-th interpolated frame, the ½-th interpolated frame and the ¾-th interpolated frame corresponding to the first display region, based on a relationship between a gray level of the previous (n−1)-th frame and a gray level of the current n-th frame, and outputs a first corrected previous (n−1)-th frame, a first corrected ¼-th interpolated frame, a first corrected ½-th interpolated frame and a first corrected ¾-th interpolated frame, respectively, the first timing unit sequentially rearranges the first corrected previous (n−1)-th frame, the first corrected ¼-th interpolated frame, the first corrected ½-th interpolated frame and the first corrected ¾-th interpolated frame, the first timing unit outputs the first corrected previous (n−1)-th frame, the first corrected ¼-th interpolated frame, the first corrected ½-th interpolated frame and the first corrected ¾-th interpolated frame during the period, and the second timing unit receives the two of the ¼-th interpolated frame, the ½-th interpolated frame and the ¾-th interpolated frame from the second image interpolation chip simultaneously during the period, the second timing unit corrects the gray level of the previous (n−1)-th frame, the ¼-th interpolated frame, the ½-th interpolated frame and the ¾-th interpolated frame corresponding to the second display region, based on the relationship between the gray level of the previous (n−1)-th frame and the gray level of the current n-th frame and outputs a second corrected previous (n−1)-th frame, a second corrected ¼-th interpolated frame, a second corrected ½-th interpolated frame and a second corrected ¾-th interpolated frame, respectively, and the second timing unit sequentially rearranges the second corrected previous (n−1)-th frame, the second corrected ¼-th interpolated frame, the second corrected ½-th interpolated frame and the second corrected ¾-th interpolated frame, and the second timing unit outputs the second corrected previous (n−1)-th frame, the second corrected ¼-th interpolated frame, the second corrected ½-th interpolated frame, and the second corrected ¾-th interpolated frame during the period.

4. The display device of claim 3, wherein when the gray level of the current n-th frame is greater than the gray level of the previous (n−1)-th frame, the corrected gray level of the current n-th frame is greater than or equal to the gray level of the current n-th frame, and when the gray level of the current n-th frame is less than the gray level of the previous (n−1)-th frame, the corrected gray level of the current n-th frame is less than or equal to the gray level of the current n-th frame.

5. The display device of claim 3, wherein the first timing unit and the second timing unit each correct the gray level of the current n-th frame using a respective same memory, and the first timing unit and the second timing unit sequentially rearrange the first corrected previous (n−1)-th frame, the first corrected ¼-th interpolated frame, the first corrected ½-th interpolated frame and the first corrected ¾-th interpolated frame, and the second corrected previous (n−1)-th frame, the second corrected ¼-th interpolated frame, the second corrected ½-th interpolated frame and the second corrected ¾-th interpolated frame, respectively, using the same memory.

6. The display device of claim 3, wherein the first timing unit and the second timing unit comprise a timing chip, a first timing memory and a second timing memory.

7. The display device of claim 6, further comprising an odd-numbered period and an even-numbered period, wherein the timing chip of the first timing unit writes the ¾-th interpolated frame, the first corrected previous (n−1)-th frame, the first corrected ¼-th interpolated frame, the first corrected ½-th interpolated frame and the first corrected ¾-th interpolated frame to the first timing memory in an odd-numbered period, and the timing chip of the first timing unit sequentially reads the first corrected previous (n−1)-th frame, the first corrected ¼-th interpolated frame, the first corrected ½-th interpolated frame and the first corrected ¾-th interpolated frame from the first timing memory in the even-numbered period while reading the ¾-th interpolated frame during the even-numbered period.

8. The display device of claim 7, wherein the timing chip of the second timing unit writes the ¾-th interpolated frame, the second corrected current n-th frame, the second corrected ¼-th interpolated frame, the second corrected ½-th interpolated frame, and the second corrected ¾-th interpolated frame to the second timing memory in the even-numbered period, and the timing chip of the second timing unit sequentially reads the second corrected previous (n−1)-th frame, the second corrected ¼-th interpolated frame, the second corrected ½-th interpolated frame and the second corrected ¾-th interpolated frame from the second timing memory in the odd-numbered period while reading the ¾-th interpolated frame during the odd-numbered period.

9. The display device of claim 7, wherein the pixels are arranged in a matrix pattern, and the first corrected previous (n−1)-th frame, the second corrected previous (n−1)-th frame, the first corrected ¼-th interpolated frame, the second corrected ¼-th interpolated frame the first corrected ½-th interpolated frame, the second corrected ½-th interpolated frame, the first corrected ¾-th interpolated frame, the second corrected ¾-th interpolated frame and the ¾-th interpolated frame written serially based on units of rows of the matrix pattern.

10. The display device of claim 9, wherein the ¾-th interpolated frame in first row of the rows of the matrix pattern is read while one of the first corrected previous(n−1)-th frame and the second corrected previous (n−1)-th frame, one of the first corrected ¼-th interpolated frame and the second corrected ¼-th interpolated frame, one of the first corrected ½-th interpolated frame and the second corrected ½-th interpolated frame and one of the first corrected ¾-th interpolated frame and the second corrected ¾-th interpolated frame are read in second through fifth rows, respectively, of the matrix pattern.

11. The display device of claim 7, wherein the timing chip further comprises a line memory which temporarily stores data during at least one of a write operation and a read operation.

12. The display device of claim 11, wherein the line memory comprises:

a read buffer;

a write buffer; and a ¾-th buffer, wherein the read buffer and the write buffer temporarily store one of the first corrected previous (n−1)-th frame and the second corrected previous (n−1)-th frame, one of the first corrected ¼-th interpolated frame and the second corrected ¼-th interpolated frame, one of the first corrected ½-th interpolated frame and the second corrected ½-th interpolated frame and one of the first corrected ¾-th interpolated frame and the second corrected ¾-th interpolated frame, and the ¾-th buffer temporarily stores the ¾-th interpolated frame.

13. A display device comprising:
a display panel having pixels;
an image interpolation unit which receives an original image signal and only outputs both a previous (n−1)-th frame of the original image signal, as well as a ¼-th interpolated frame, a ½-th interpolated frame and a ¾-th interpolated frame which are inserted between the previous (n−1)-th frame and a current n-th frame of the original image signal; and
one or more timing units which
receive the previous (n−1)-th frame, the ¼-th interpolated frame, the ½-th interpolated frame and the ¾-th interpolated frame simultaneously during a period,
correct a gray level of the previous (n−1)-th frame, the ¼-th interpolated frame the ½-th interpolated frame and the ¾-th interpolated frame based on a relationship between a gray level of the previous (n−1)-th frame and a gray level of the current n-th frame to output a corrected previous (n−1)-th frame, a corrected ¼-th interpolated frame, a corrected ½-th interpolated frame and a corrected ¾-th interpolated frame, respectively,
sequentially rearrange the corrected previous (n−1)-th frame, the corrected ¼-th interpolated frame, the corrected ½-th interpolated frame and the corrected ¾-th interpolated frame, and
output the corrected (n−1)-th frame, the corrected ¼-th interpolated frame, the corrected ½-th interpolated frame and the corrected ¾-th interpolated frame during the period,
wherein the one or more timing units corrects the gray level of the current n-th frame and sequentially rearranges the corrected (n−1)-th frame, the corrected ¼-th interpolated frame, the corrected ½-th interpolated frame and the corrected ¾-th interpolated frame using a same memory.

14. The display device of claim 13, wherein the one or more timing units comprise a timing chip, a first timing memory and a second timing memory.

15. The display device of claim 14, wherein
the timing chip writes the ¾-th interpolated frame, the corrected previous (n−1)-th frame, the corrected ¼-th interpolated frame, the corrected ½-th interpolated frame and the corrected ¾-th interpolated frame to the first timing memory in an odd-numbered period, and
the timing chip sequentially reads the corrected previous (n−1)-th frame, the corrected ¼-th interpolated frame, the corrected ½-th interpolated frame and the corrected ¾-th interpolated frame from the first timing memory in an even-numbered period while reading the ¾-th interpolated frame during the even-numbered period.

16. The display device of claim 15, wherein
the pixels are arranged in a matrix pattern, and
the corrected previous (n−1)-th frame, the corrected ¼-th interpolated frame, the corrected ½-th interpolated frame, the corrected ¾-th interpolated frame and the uncorrected ¾-th interpolated frame are serially written based on units of rows of the matrix.

17. The display device of claim 16, wherein the ¾-th interpolated frame is read from a first row of the matrix pattern while the corrected previous (n−1)-th frame, the corrected ¼-th interpolated frame, the corrected ½-th interpolated frame and the corrected ¾-th interpolated frame are read from second through fifth rows, respectively, of the matrix pattern.

18. The display device of claim 15, wherein the timing chip further comprises line memories which temporarily store data during at least one of a write operation and a read operation.

19. The display device of claim 11, wherein the line memories comprise:
a read buffer; a write buffer; and
a ¾-th buffer, wherein
the read buffer and the write buffer temporarily store the corrected previous (n−1)-th frame, the corrected ¼-th interpolated frame, the corrected ½-th interpolated frame and the corrected ¾-th interpolated frame, and the ¾-th buffer temporarily stores the ¾-th interpolated frame.

20. A method of driving a display device, the method comprising:
preparing a display panel comprising pixels, wherein the display panel includes a first display region and a second display region;
receiving an original image signal with a first image interpolation chip;
inserting one of a ¼-th interpolated frame, a ½-th interpolated frame and a ¾-th interpolated frame between a previous (n−1)-th frame of the original image signal and a subsequent n-th frame of the original image signal with the first image interpolation chip;
only outputting the previous (n−1)-th frame of the original image signal and the one of the ¼-th interpolated frame, the ½-th interpolated frame and the ¾-th interpolated frame from the first image interpolation chip to a first timing unit;
receiving the original image signal with a second image interpolation chip;
outputting two of the ¼-th interpolated frame, the ½-th interpolated frame and the ¾-th interpolated frame from the second image interpolation chip to a second timing unit;
outputting a first quadruple-speed image signal to the pixels in the first display region with the first timing unit;
outputting a second quadruple-speed image signal to pixels in the second display region with the second timing unit;
transmitting data corresponding to the previous (n−1)-th frame and the one of the ¼-th interpolated frame, the ½-th interpolated frame and the ¾-th interpolated frame from the first timing unit to the second timing unit; and
transmitting data corresponding to the two of the ¼-th interpolated frame, the ½-th interpolated frame and the ¾-th interpolated frame from the second timing unit to the first timing unit,
wherein the first timing unit and the second timing unit comprise a timing chip and two timing memories.

* * * * *